United States Patent
Snyder et al.

(10) Patent No.: US 10,759,089 B1
(45) Date of Patent: *Sep. 1, 2020

(54) RECYCLING MATERIALS IN VARIOUS ENVIRONMENTS INCLUDING REDUCED GRAVITY ENVIRONMENTS

(71) Applicant: Made In Space, Inc., Moffett Field, CA (US)

(72) Inventors: Michael Snyder, Mountain View, CA (US); Jason Dunn, Mountain View, CA (US); Aaron Kemmer, Mountain View, CA (US); Eddie Gonzalez, San Francisco, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,966

(22) Filed: Aug. 20, 2018

Related U.S. Application Data

(63) Continuation of application No. 14/604,743, filed on Jan. 25, 2015, now Pat. No. 10,052,797.
(Continued)

(51) Int. Cl.
*B29B 17/00* (2006.01)
*B29C 64/357* (2017.01)
(Continued)

(52) U.S. Cl.
CPC ........ *B29B 17/0026* (2013.01); *B29C 48/287* (2019.02); *B29C 48/92* (2019.02);
(Continued)

(58) Field of Classification Search
CPC ... B29B 17/0026; B29C 48/287; B29C 48/92; B29C 64/357; B29C 64/106;
(Continued)

(56) References Cited

U.S. PATENT DOCUMENTS 3,355,117 A * 11/1967 Gerhardt .............. B65H 67/048
242/474.6
3,633,835 A 1/1972 Beers
(Continued)

FOREIGN PATENT DOCUMENTS

JP 2009013395 1/2009

OTHER PUBLICATIONS

Baechler et al., "Distributed Recycling of Waste Polymer into RepRap Feedstock" Rapid Prototyping Journal, 19(2), pp. 118-125 (2013). (Year: 2013).*

*Primary Examiner* — Michael N Orlando
*Assistant Examiner* — Christopher W Raimund
(74) *Attorney, Agent, or Firm* — Terry M. Sanks, Esq.

(57) ABSTRACT

Recycling devices for producing additive manufacturing filament from received materials including objects to be recycled, discarded objects, obsolete objects, and the like. A recycling device may include a material processing system an extrusion mechanism and a spooling assembly. The material processing system receives material, reduces the size of the received material via a material size reducer and actively pushes the material through at least a portion of the device. The extrusion mechanism produces filament from the material and the spooling assembly loads the filament onto a spool for later use. The spooling assembly may include detachable elements configured to interface with and supply filament to an additive manufacturing device. Depending on configuration, recycling devices may create filament from plastic, metal, in-situ material, or a combination thereof.

20 Claims, 19 Drawing Sheets

Related U.S. Application Data

(60) Provisional application No. 61/931,568, filed on Jan. 25, 2014.

(51) Int. Cl.
    *B33Y 40/00*         (2020.01)
    *B33Y 70/00*         (2020.01)
    *C22B 1/00*          (2006.01)
    *B29C 48/92*        (2019.01)
    *B29C 48/285*      (2019.01)
    *B29C 64/106*      (2017.01)
    *B33Y 10/00*         (2015.01)

(52) U.S. Cl.
    CPC .............. *B29C 64/357* (2017.08); *B33Y 40/00* (2014.12); *B33Y 70/00* (2014.12); *C22B 1/005* (2013.01); *B29C 64/106* (2017.08); *B33Y 10/00* (2014.12); *Y02P 10/212* (2015.11); *Y02W 30/62* (2015.05)

(58) Field of Classification Search
    CPC ......... C22B 1/005; B33Y 40/00; B33Y 70/00; B33Y 10/00; Y02P 10/212; Y02W 30/62
    See application file for complete search history.

(56) References Cited

U.S. PATENT DOCUMENTS

| | | | |
|---|---|---|---|
| 4,093,135 A * | 6/1978 | Hermanns | B65H 54/34 242/165 |
| 4,925,512 A | 5/1990 | Briand | |
| 5,407,624 A | 4/1995 | Engh, III et al. | |
| 6,575,548 B1 | 6/2003 | Corrigan et al. | |
| 7,122,246 B2 * | 10/2006 | Comb | B29C 48/92 428/364 |
| 7,168,935 B1 | 1/2007 | Taminger et al. | |
| 8,201,717 B2 | 6/2012 | Varga et al. | |
| 8,983,957 B2 | 3/2015 | Rathod | |
| 2001/0030383 A1 | 10/2001 | Swanson et al. | |
| 2003/0173448 A1 | 9/2003 | Angold et al. | |
| 2003/0235635 A1 | 12/2003 | Fong et al. | |
| 2004/0035542 A1 | 2/2004 | Ederer et al. | |
| 2004/0159593 A1 * | 8/2004 | Allen | B03B 9/06 209/606 |
| 2005/0129941 A1 * | 6/2005 | Comb | B29C 48/92 428/364 |
| 2005/0194401 A1 | 9/2005 | Khoshnevis | |
| 2008/0087372 A1 | 4/2008 | Jones et al. | |
| 2008/0150192 A1 | 6/2008 | Perret et al. | |
| 2008/0254292 A1 | 10/2008 | Kim | |
| 2009/0106560 A1 | 4/2009 | Chopart | |
| 2009/0208577 A1 | 8/2009 | Xu et al. | |
| 2009/0267269 A1 | 10/2009 | Lim et al. | |
| 2010/0332599 A1 | 12/2010 | Tapolcai | |
| 2012/0113473 A1 | 5/2012 | Pettis | |
| 2013/0209600 A1 | 8/2013 | Tow | |
| 2013/0301874 A1 | 11/2013 | Welch | |
| 2014/0046473 A1 | 2/2014 | Boynton | |
| 2014/0277659 A1 | 9/2014 | Kumar et al. | |
| 2014/0316546 A1 | 10/2014 | Walsh et al. | |
| 2015/0108687 A1 | 4/2015 | Snyder | |
| 2016/0042255 A1 | 2/2016 | Ganesh | |
| 2016/0082664 A1 | 3/2016 | Snyder | |
| 2016/0082665 A1 | 3/2016 | Snyder | |
| 2016/0371472 A1 | 12/2016 | Walsh | |
| 2017/0063821 A1 | 3/2017 | Chen | |
| 2017/0341795 A1 | 11/2017 | Colson | |

* cited by examiner

RECYCLING MATERIALS IN VARIOUS ENVIRONMENTS INCLUDING REDUCED GRAVITY ENVIRONMENTS

CROSS-REFERENCE TO RELATED APPLICATIONS

This application is a Continuation of U.S. application Ser. No. 14/604,743 filed Jan. 25, 2015, which claims the benefit of U.S. Provisional No. 61/931,568 filed Jan. 25, 2014, the entire contents of which are incorporated herein by reference.

FIELD OF THE DISCLOSURE

The present disclosure generally relates to recycling materials, and more particularly to apparatus, systems and methods for creating recycled feedstock for additive manufacturing devices.

BACKGROUND

Delivery of materials to space is an expensive and time-consuming undertaking and materials are rarely reused. Currently, launch costs per kilogram to low Earth orbit (LEO) are well over $1,000 per kilogram. As of 2013, estimated cost per kilogram of the Atlas V® vehicle (available from United Launch Alliance, LLC of Centennial, Colo.) is $13,000. The Falcon 9 v. 1.1 vehicle (available from Space Exploration Technologies, Inc. of Hawthorne, Calif.) delivers payloads to LEO for $4,000 per kilogram. At such prices, even the simplest items, such as a wrench, screw driver, or a clip, have total costs measured in the hundreds or thousands of dollars.

Additional barriers currently exist for rapid delivery of goods and materials to manned and unmanned spacecraft because launches are also infrequent, booked many years in advance and often significantly delayed. Even frequent destinations such as the International Space Station receive supplies infrequently. For example, six unmanned spacecraft delivered materials and fuel (also known as "up mass") to the ISS in 2011. In 2012, resupply missions were carried out nine times. Space is limited on such resupply missions, delaying delivery of replacement parts. When replacement parts are sent to the ISS, they require up mass that could be used to send additional supplies, equipment and scientific experiments to the ISS.

Exemplary resupply missions to the ISS utilize unmanned spacecraft, such as the Dragon capsule (available from Space Exploration Technologies, Inc. of Hawthorne, Calif.), the Russian Progress freighter spacecraft, or the Cygnus vehicle (available from Orbital Sciences Corporation of Dulles, Va.). The resupply spacecraft is launched into orbit carrying supplies including new equipment, replacement parts, fuel, oxidizer, food, water and scientific experiments. The spacecraft docks with the ISS and is unloaded. The spacecraft is then reloaded. If the spacecraft is capable of being returning to Earth and being recovered (e.g., the Dragon capsule), it is loaded with science experiments, old station hardware, equipment, and trash. The spacecraft is then launched, returning to Earth for recovery. If the spacecraft is not capable of being recovered, the spacecraft is typically loaded with trash and launched, where it burns up on reentry.

Trash management is problematic in isolated locations such as aboard a spacecraft, on naval vessels, and at remote outposts. In the ISS, all trash is stored on board in the habitable volume until it is disposed of as described above. Astronauts compress the trash by hand into stowage bags, but this can only reduce the volume by an estimated 50%. The present "store and return" method has limitations. For example, it will not meet the requirements for future human space exploration missions. Missions to deep space destinations such as the Moon, asteroids, Lagrange Points, and Mars will require different disposal methods. Ejecting trash into space, as practiced with liquid waste during the Apollo missions, is not practical or efficient for solid trash such as packing materials, broken equipment, and the like. With the possibility of resupply years between or nonexistent, astronauts must bring everything with them, meaning every piece of cargo is a precious resource. Furthermore, missions will need to safely manage waste and avoid polluting and contaminating other solar system bodies by, for example, abiding by NASA's Planetary Protection Policy (NASA NPD 8020.7. "Biological Contamination Control for Outbound and Inbound Planetary Spacecraft").

Currently, recycling or repurposing materials in space presents several problems. Among traditional recycling processes do not function in the microgravity environment of space. Similarly, current recycling processes are not adapted for use in high acceleration and vibration environments such as those found aboard a naval vessel or submarine.

On Earth, naval vessels that are required to be at sea for extended amounts of time face similar logistical problems such as dealing with long periods of time between resupply events, a lack of recycling opportunities and inefficient waste management during voyages. Research stations located in remote locations such as Antarctica require similar logistical challenges.

Given the foregoing, apparatus, systems and methods are needed which facilitate recycling of trash aboard spacecraft, space habitats, and the like. Additionally, apparatus, systems and methods are needed which facilitate reducing mass and volume devoted to trash storage and transportation.

Additionally, what is needed are apparatus, systems and methods which reduce trash volume and mass and facilitate recycling of trash during long duration explorations, at remote outposts, and aboard naval vessels.

Additionally, what is needed are apparatus, systems and methods which facilitate processing in-situ resources into a usable form.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing apparatus, systems, and methods which facilitate a significant reduction of wasted logistical mass, as well as a reduction in the volume of trash storage. A recycler device is provided which converts what was previously waste into a filament. Other materials such as in-situ resources, useful objects, and the like may also be converted into filament. In some aspects, the filament produced may be used by an additive manufacturing device to manufacture tools, new replacement parts, and a variety of other functional parts without the need for a resupply operation. Conversion of trash to filament may also reduce volume devoted to trash storage and enable converted materials to be stored in a wider variety of locations. Such apparatus, systems, and methods may be utilized aboard spacecraft, space habitats, during long duration explorations, at remote outposts, aboard naval vessels, and other locations and environments apparent to those having skill in the relevant art(s) after reading the description herein.

Aspects of the present disclosure facilitate maximizing available resources by turning trash into useful feedstock, such as a filament. The feedstock may be used to fabricate functional parts using an additive manufacturing device. The recycler devices of the present disclosure are designed for simple and safe operation, while minimizing required personnel interaction. The recycler device will accept trash materials with various compositions and create feedstock that is compatible with additive manufacturing machines on Earth and at off-Earth locations.

In an aspect, a recycler device is provided comprising a material control system, a material size reducer, an extrusion mechanism, and a spooling assembly. Trash, in-situ materials, or other items for recycling are placed in the material control system. The material control system and the material size reducer sequentially reduce the size of the materials placed into the recycler device and force the materials through each portion of the recycler device. The extruder converts the material into a filament. The filament is then may be spooled by the spooling assembly. The filament produced may be used by an additive manufacturing device to produce new parts. The filament may also be stored for future use or disposal. The spooling assembly may spool the filament onto a spool adapted for use by an additive manufacturing device to produce parts.

In an aspect, a recycler device is provided which is configured to satisfy all NASA requirements and regulations for flight and operation aboard the International Space Station. In another aspect, a recycler device is provided which is configured to comply with NASA's Planetary Protection Policy.

In various aspects of the present disclosure, a recycler device is provided which may operate in an office, in a home, in an industrial setting, in a research laboratory, and aboard naval vessels (e.g., ships, submarines), particularly in enclosed locations. The recycler device may be utilized at remote locations, isolated locations, or facilitate waste reduction and management in industrial settings. The present recycler devices may be utilized to recycle parts previously manufactured by additive manufacturing processes or other processes.

Apparatus, systems and methods of the present disclosure facilitate reducing the burden of trash aboard the ISS. In the case of the ISS resupply missions, if a resupply spacecraft is capable of returning to Earth and being recovered (e.g., the Dragon capsule), it is loaded with science experiments, old station hardware, equipment, and trash. The spacecraft is then launched, returning to Earth for recovery. If the spacecraft is not capable of being recovered, the spacecraft is typically loaded with trash and launched, where it burns up on reentry. In both cases, reducing the volume and mass of trash would reduce operational pressures for the ISS. Where the spacecraft is capable of returning to Earth, more volume and mass would be available for returning useful payloads to Earth (e.g., scientific experiments). Where the spacecraft disintegrates on reentry, reducing the amount or volume of waste may reduce the need to dispose of trash and increase the amount of trash that can be disposed of per spacecraft. The recycler device of the present disclosure enables conversion of trash into usable filament for additive manufacturing devices. Surplus filament or unusable filament may be stored for later disposable. Such filament also occupies a smaller volume than trash stored using conventional "store and return" methods.

Creation of filament from surplus materials, trash, or in-situ materials facilitates utilization of additive manufacturing devices on location (e.g., aboard a spacecraft, aboard the ISS, aboard a submarine). Parts, tools, upgrades, and the like may be created on-demand, rather than waiting for a resupply mission, thus saving time, mass, material, overhead, and transportation while increasing safety and redundancy. In an emergency, the exact solution part may be created.

Filament may be created from polymers, metals, and other materials that are capable of being broken down and reconstituted. Filament may be made from or constitute any type of thermoplastic, plastic, metal, composites, resins, virgin materials or any other material or combination of materials apparent to those skilled in the relevant art(s) after reading the description herein.

In an aspect, a recycler device is provided which is gravity independent, allowing for nominal operation regardless of the gravity, vibration, or force environment in which the recycler device is placed.

In various aspects, the recycler device of the present disclosure may be utilized to mitigate waste management problems (e.g., compact storage, lack of recycling opportunities) in other environments such as long duration explorations, remote outposts, naval vessels, and the like.

Plastic packaging is a significant component of common waste produced on spacecraft, space stations, remote outposts, naval vessels and the like. In fact, studies have shown that for a one-year mission away from earth, 15% of the estimated 588 kilograms of food mass necessary would be packaging. Such packaging is often plastic. Such material can be repurposed by a recycler device in accordance with the present disclosure into additive manufacturing feedstock in order to create items that are useful for the mission, reducing the need to launch those items. Because launch costs can be $10,000/kilogram or more, significant savings can be realized.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to apparatus, systems and methods which facilitate a significant reduction of wasted logistical mass, as well as a reduction in the volume of trash storage. In an aspect, a recycler device is provided which converts materials such as old parts, trash, or other waste into a usable form, such as a filament. In some aspects, the filament produced may be used by an additive manufacturing device to manufacture tools, new replacement parts, and a variety of other functional objects. Conversion of trash to filament may also reduce volume devoted to trash storage and enable converted materials to be stored in a wider variety of locations.

Apparatus, systems, and methods in accordance with the present disclosure may be utilized aboard spacecraft, space habitats, during long duration explorations, at remote outposts, aboard naval vessels, and other locations and environments apparent to those having skill in the relevant art(s) after reading the description herein.

Recycler devices in accordance with the present disclosure may repurpose parts which were improperly additively manufactured into the feedstock utilized, thereby facilitating subsequent attempts to create the desired part without wasting feedstock. Used parts, obsolete parts, single use items, trash and the like may be repurposed into feedstock and subsequently used to print a part that is more immediately useful. In emergency situations or situations with limited supplies, objects may be "cannibalized" into additive manufacturing device feedstock by recycler devices in accordance with the present disclosure and repurposed into needed items by an additive manufacturing device on site, thereby potentially alleviating problems in resource scarce situations or in situations where the right tool is not immediately available because objects without a use can be converted to useful objects.

Figure 1:
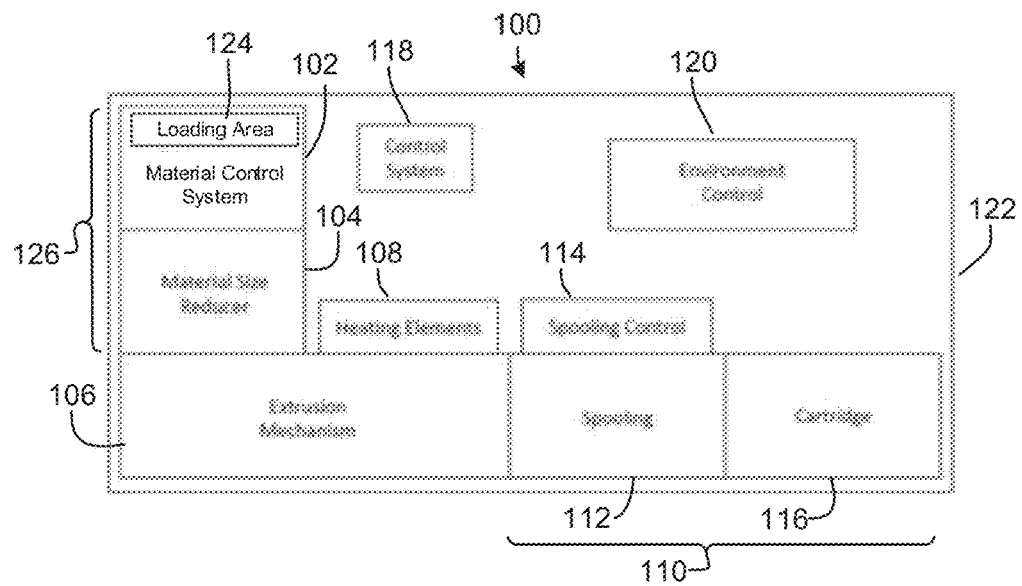
FIG. 1 is a block diagram of a recycler device, according to an aspect of the present disclosure.

Referring now to FIG. 1, a block diagram of a recycler device 100, according to an aspect of the present disclosure, is shown.

Figure 2:
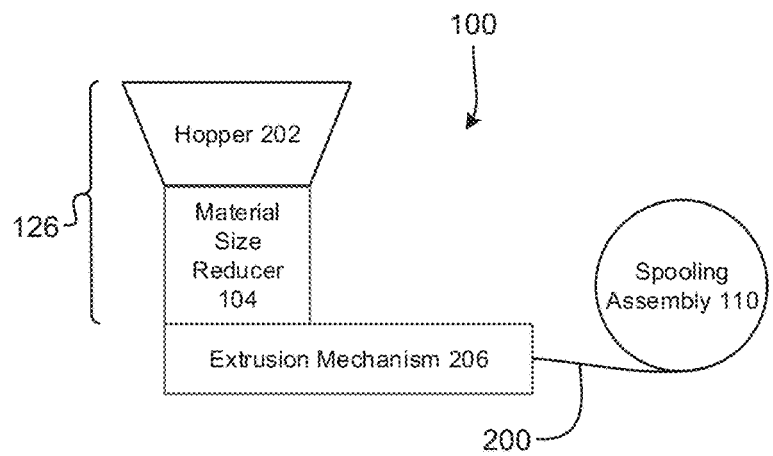
FIG. 2 is a schematic of a recycler device, according to an aspect of the present disclosure.

Recycler device 100 is configured to accept materials such as trash, broken or obsolete parts, in-situ materials, and the like and convert the materials to a feedstock such as a filament 200 (see FIG. 2). Recycler device 100 may be configured to accept objects made from polymers acrylonitrile butadiene styrene (ABS), polyethylene (PE) (including resealable PE bags such as Ziploc bags available from S. C. Johnson & Son, Inc. of Racine, Wis.), high density polyethylene (HDPE), low density polyethylene (LDPE), nylon, polymer foam, other polymers, monomers, composite materials, metals, resins, virgin materials, in-situ materials, combinations of any of the foregoing and any other material apparent to those skilled in the relevant art(s) after reading the description herein which is capable of being broken down and reconstituted. Such materials are converted into feedstock such as filament 200. Filament 200 may be any type of thermoplastic or any other material apparent to those skilled in the relevant art(s) after reading the description herein.

Recycler device 100 comprises a material processing system 126, an extrusion mechanism 106, and a spooling assembly 110. Material processing system 126 receives material to be processed into filament 202 and breaks down the received material into portions which can be received by extrusion mechanism 106. Material processing system 126 may include a material control system 102, a material size reducer 104, and a loading area 124. Recycler device 100 may further comprise heating elements 108, control system 118, and environmental control 120. Some or all of the portions of recycler device 100 may be contained within housing 122.

Recycler device may be integral with an additive manufacturing device, such as the additive manufacturing device described with reference to FIG. 3. Filament 200 may be fed into the extruder of the additive manufacturing device from recycler device 100, stored within the combination recycler and additive manufacturing device or stored/used elsewhere.

Material control system 102 drives material towards desired locations in recycler device 100, facilitating processing of material placed in device 100 and moving material through recycler device 100 with or without assistance from external forces such as gravity. As shown in more detail in the various configurations depicted in FIGS. 17A & B, material control system 102 may comprise direct or indirect airflow systems (e.g., fans, air compressors) pressure fed systems, or physical contacting devices in order to drive material through recycler device 100. In another aspect, material control system 102 is a centrifuge which spins recycler device 100, thereby using centrifugal forces to force material into other properly positioned portions of recycler device 100. In another aspect, the material is a magnetic or paramagnetic material and material control system comprises electromagnets which drive material through recycler device 100.

In various aspects, material control system 102 includes a loading area 124 which receives material for recycling from users or other devices. Loading area 124 may be a manually operable sliding tray. In other aspects, loading area 124 may include an open volume such as a box or cone where material may be placed for introduction into other portions of device 100 and recycling. Material control system 102 may be an active, electronically controlled (via, for example, control system 118) system, ensuring a constant rate of material is delivered to extrusion mechanism 106. Such system may be gravity-independent. Such operation ensures that breakages do not occur in filament 200. Spooling filament 200 as it is created also reduces the threat of newly created filament breaking Size reducer 104 reduces the size of materials inserted into recycler device 100 from their original size to a shape and size suitable for use in extrusion mechanism 106. Size reducer 104 may shred, grind, cut, and/or pulverize material into portions small enough for utilization by extrusion mechanism 106. In an aspect, extruder requires materials no larger than three millimeters in diameter. In such an aspect, size reducer 104 is configured to break material apart into portions no larger than three millimeters in diameter.

In some aspects, material size reducer 104 and/or other portions of material processing system 126 includes heating elements configured to heat material within size reducer 104 in order to make the material more malleable, melt some or all of the material, or otherwise facilitate reduction of the size of pieces of the material. Cooling elements may also be included in order to provide additional control over material temperature.

Recycler device 100 may also include one or more material sorting elements. Material sorting elements are configured to sort material inserted into recycler device 100 into various types (e.g., food waste, metal, aluminum, ferrous metal, non-ferrous metal, plastic and the like). Sorted material may then be processed by other portions of recycler device 100 in order to create filament 200 having a uniform material make up. Recycler device 100 may also include one or more storage containers for each type of material. Sorted material in the storage containers may be selectively sent into other portions of recycler device 100 in order to be turned into filament 200 containing such material (as a pure filament or mixed with other types of materials). Such containers may include material control sub systems configured to operate like material control system 104 and force material from the container. In other aspects, sorting is done by recycler device 100 users who only place the desired material types in device 100.

Material processing system 126 may include various filters, dehumidifying elements, drying elements, sieves, grates, and the like in order to render processed material suitable for conversion to filament 200 by other portions of recycler device 100. Material control system 102 actively pushes the material through at least a portion of the device.

Extrusion mechanism 106 receives material from size reducer 104, further manipulates the size and shape of the material, heats the material via one or more attached heating elements 108 and pushes the pliable or molten material through a die in order to create filament 200 or other feedstock. Material may be moved through extrusion mechanism 106 via an auger, a piston, another mechanism apparent to those skilled in the relevant art(s) or a combination thereof. Extrusion mechanism 106 may include one or more flowmeters, heating elements, cooling elements, filters, screens, grates, breaker plates, expansion volumes, gear pumps and the like. Such components may be selected and positioned to reduce impurities in the material, homogenize the mixture of the material, eliminate air bubbles, control flow rate, maintain pressure within the material, and/or reduce temperature variations. Such components may be selected and positioned to facilitate other design constraints apparent to those skilled in the relevant art(s) after reading the description herein.

Spooling assembly 110 is configured to receive filament 200 as it exits extrusion mechanism 106 at die 1002 and spool filament 200 onto a spool suitable for utilization by additive manufacturing device 300, such as a removable filament cartridge. Spooling assembly 110 may comprise a spooling mechanism 112, such as a rotating wheel configured to receive and spool filament 200. One or more portions of spooling assembly may be controlled by spooling control 114. Spooling control 114 may be controlled by an attending technician or controlled by control system 118. In an aspect, filament 200 is spooled within a removable cartridge 116 configured to connect to an additive manufacturing device and provide filament for its utilization. In one such aspect, within cartridge enclosure, filament 200 is fed through the center of the spool and exits cartridge 116 from a side panel of cartridge 116.

In various aspects, recycler device 100 is configured to spool filament 200 directly into a removable cartridge 116. In an aspect cartridge 116 is configured to be removed from recycler device 100 and interface with an additive manufacturing device.

Environmental control 120 is configured to monitor and regulate the environment of recycler device 100. In an aspect, environmental control 120 is comprises at least one fan, a temperature regulation device (e.g., a heater, an air conditioning unit), and a filter. Environmental control 120 regulates one or more of: temperature, humidity, and air quality within recycler device 100, thereby preventing outgas sing and contamination of the environment in which additive manufacturing device 100 is located during operation. Environmental control unit 120 may be configured to filter the device 100 environment for a preset amount of time after operation or until contaminants are reduced below a specified level and then signal that device 100 is safe to access.

Recycler device 100 may comprise housing 122 which contains each element of recycler device 100, enabling control of the environment of recycler device 100 by environmental control 120. Housing 122 may be airtight, preventing contaminants from escaping into the surrounding environment from recycler device 100 and vice versa.

Control system 118 may be software, hardware, or a combination of software and hardware. Control system 306 is configured to facilitate and control operation of recycler device 120, converting materials inserted into recycler device 100 into feedstock or another form, such as filament 200, facilitating safe operation of device 100, and/or monitoring and tracking production of device 100.

Recycler device 100 is configured to control the movement of the material throughout each portion of recycler device 100 as the material is converted to filament 200. Material is guided into extrusion mechanism 106 in a controlled manner in order to avoid air pockets or other gaps.

In an aspect, recycler device 100 is configured to meet all power, volume, mass, and safety requirements for operation aboard the ISS. In another aspect, recycler device 100 is configured to operate aboard a naval vessel, including a vessel underway.

Recycler device 100 may be adapted for use in a variety of environments, including in an office, in a home, in an industrial setting, in a research laboratory, and aboard naval vessels (e.g., ships, submarines), particularly in enclosed locations. Other locales where recycler device 100 may be utilized include remote locations, isolated locations, and in space.

Referring now to FIG. 2, a schematic of recycler device 100, according to an aspect of the present disclosure, is shown.

Recycler device 100 may comprise one or more hoppers 202. Hopper 202 holds material as it proceeds from one portion of recycler device 100 to another. In an aspect in accordance with FIG. 2, hopper 202 is positioned between material control system 102 and size reducer 104. Hopper 202 is a funnel which guides material into size reducer 104. Recycler device 100 may include multiple hoppers 202 and a hopper selector which allows material from a selected hopper 202 to enter size reducer 104. Each hopper 202 may be designated for a different material type.

In an aspect in accordance with FIG. 5A, hopper 202 is positioned between size reducer 104 and extrusion mechanism 106. Hopper 202 comprises a funnel and a tube. Hopper 202 guides material from size reducer 104 to extruder. In other aspects, hopper 202 is positioned before material control system 102.

Hopper 202 may comprise an access point (e.g., a door) where materials to be converted into filament 200 are inserted into recycler device 100. In another aspect, materials are inserted into recycler device via an access point on housing 122.

Figure 3:
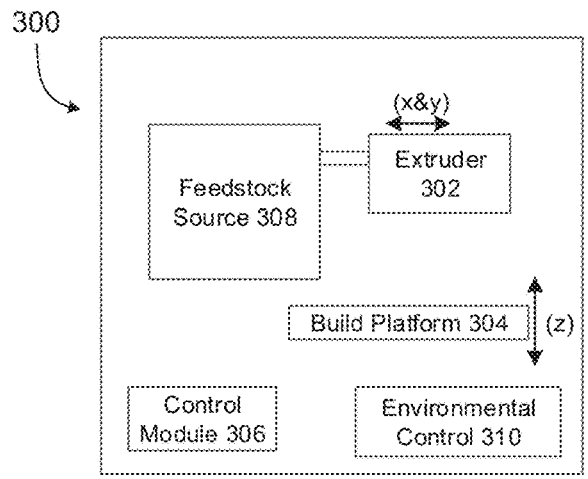
FIG. 3 is a block diagram of an exemplary additive manufacturing device, according to an aspect of the present disclosure.

Referring now to FIG. 3, a block diagram of an exemplary additive manufacturing device 300, according to an aspect of the present disclosure, is shown.

In an aspect, additive manufacturing device 300 is configured to produce parts 600 (FIG. 6) using filament 200 produced by recycler device 100. Additive manufacturing device 300 may be configured to utilize polymer filament 200, metal filament 200, filament 200 made from a mixture of materials, and the like.

Additive manufacturing device 300 comprises a filament extruder 302 positionable in two axes (e.g., x and y axes). Additive manufacturing device 300 may be a fused deposition-type device or any other additive manufacturing device apparent to those skilled in the relevant art after reading the description herein, including but not limited to a stereolithographic device, an electron beam freeform fabrication device, and a selective laser sintering device.

Additive manufacturing device 300 may be located on Earth, on another celestial body, in space, or aboard a space habitat or on a spacecraft.

Additive manufacturing device 300 further comprises a build platform 304 positionable in a third axis (e.g., the z-axis). Build platform 304 is configured to support parts as they are being constructed. In another aspect, build platform 304 is omitted. Build platform 304 is a support which holds another part, thereby enabling additive manufacturing device 300 to add additional portions (i.e., layers) to the part being held. Actuators (not shown) are attached to filament extruder 302 and build platform 304. In an aspect, additive manufacturing device 300 comprises one actuator for each axis.

Filament extruder 302 is adapted to create a desired part on build platform 304 via deposition of a polymer or other material. Deposition may be done in an additive manner, such as a layer-wise or raster pattern. The positions of filament extruder 302 and build platform 304 during construction may be controlled by a build control module 306, electrically connected to each actuator. Build control module 306 may be software, hardware, or a combination of software and hardware. Build control module 306 is configured to cause the desired part (e.g., a support structure) to be produced by additive manufacturing device 300.

Filament extruder 302 is connected to a feedstock source 308. Feedstock source 308 houses and supplies material necessary to produce on or more parts via additive manufacturing device 300. In an aspect, feedstock source 308 is a spool of polymer filament threaded into filament extruder 302. Extruder 302 is configured to heat the polymer filament to its melting point and deposit the melted polymer in order to form the desired part. In an aspect, feedstock source 308 is cartridge 116 loaded with filament created from recycler device. In an aspect, cartridge 116 is removed from recycler device and mounted on additive manufacturing device 300. In another aspect, filament 200 is fed from cartridge 116 into extruder, forming a single assembly from recycler device 100 and additive manufacturing device 300.

Environmental control 310 is configured to regulate the environment of additive manufacturing device 300. In an aspect, environmental control 310 is comprises at least one fan, a temperature regulation device (e.g., a heater, an air conditioning unit), and a filter. Environmental control 310 regulates one or more of: temperature, humidity, and air quality within additive manufacturing device 300, thereby preventing outgassing and contamination of the environment in which additive manufacturing device 300 is located during operation. Additive manufacturing device 300 may be configured according to the disclosures of U.S. patent application Ser. No. 14/331,729, entitled "Manufacturing in Microgravity and Varying External Force Environments", filed on Jul. 15, 2014 by the Applicant and incorporated herein in its entirety.

Figure 4:
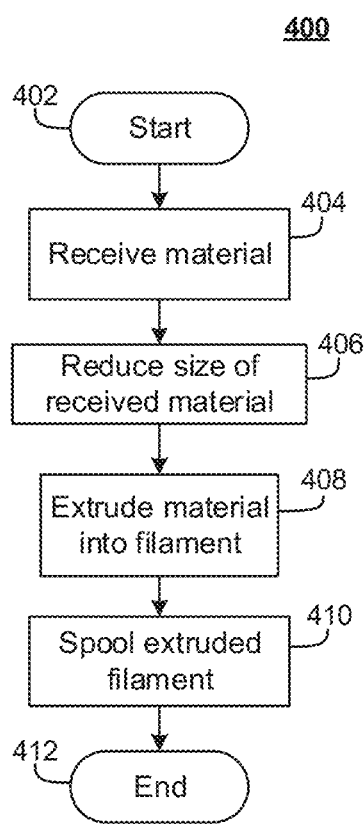
FIG. 4 is a flowchart depicting an exemplary process for recycling materials using a recycler device, according to an aspect of the present disclosure.

Referring now to FIG. 4, a flowchart depicting an exemplary process 400 for recycling materials using recycler device 100, according to an aspect of the present disclosure, is shown.

Process 400, at least a portion of which may be executed in a microgravity environment such as Earth orbit, another extraterrestrial environment, remote environment or the like, facilitates recycling of material for use in additive manufacturing device 200 or space-efficient storage for later disposal. Process 400 begins at step 402 with control immediately passing to step 404.

At step 404, material such as packing materials, discarded plastic fasteners, obsolete parts, other trash, in-situ materials, and the like are received at recycler device 100. In an aspect material is received at material control system 102. In other aspects, material is received at hopper 202 or another portion of recycler device 202. In some aspects, the material received is of a single type (e.g., a polymer, metal, in-situ material). In another aspect, multiple types of materials are received.

At step 406, material is guided into size reducer 104 via material control system 102. Material is then shredded, ground, cut, and/or pulverized into portions small enough for utilization by extrusion mechanism 106. Material is guided into size reduced via material control system 102 actions.

At step 408, extrusion mechanism 106 receives material from size reducer 104 and converts the material to filament 200.

At step 410, filament 200 is received by spooling assembly 110. Spooling assembly 110 spools or otherwise arranges filament 200 for later use, storage, or disposal.

Process 400 then terminates at step 412.

Figure 5:
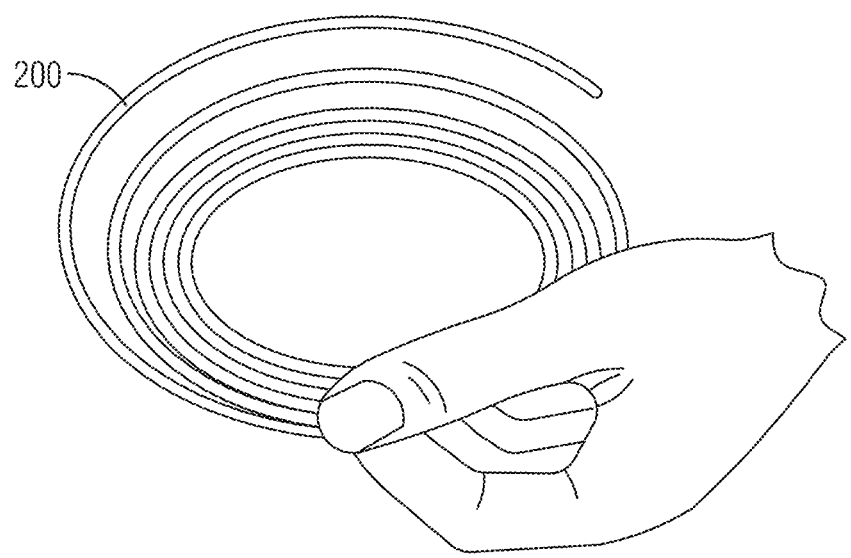
FIG. 5 is an image of filament which has been produced by a recycler device, according to an aspect of the present disclosure.

Briefly referring now to FIG. 5, filament 200 which has been produced by recycler device 200, according to an aspect of the present disclosure, is shown.

Figure 6:
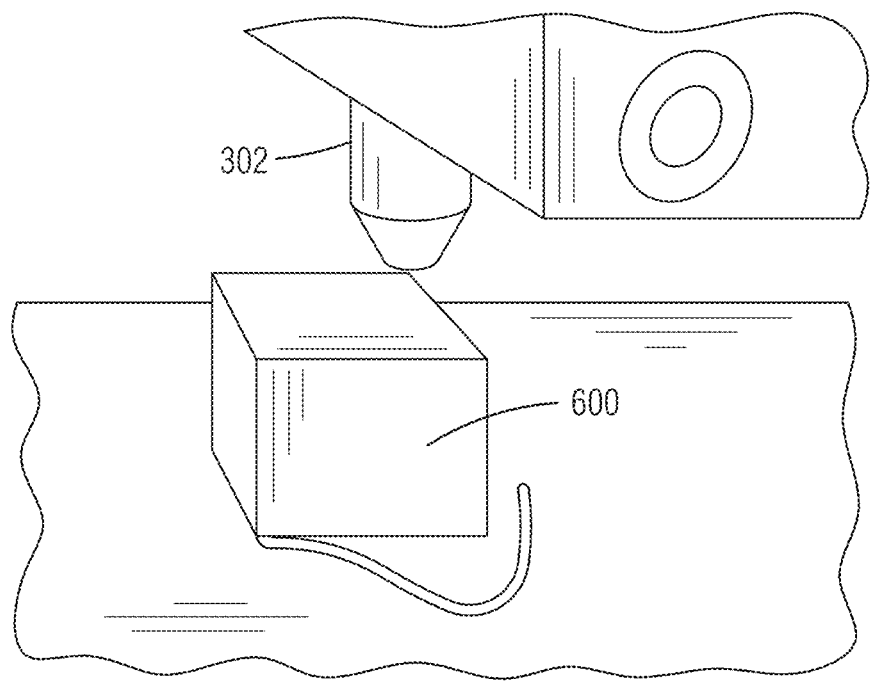
FIG. 6 is an image of a part created by an additive manufacturing device wherein filament produced by a recycler device was utilized, according to an aspect of the present disclosure.

Briefly referring now to FIG. 6, an image of part 600 created by additive manufacturing device 200 wherein filament 200 produced by recycler device 100 was utilized, according to an aspect of the present disclosure, is shown.

Figure 7:
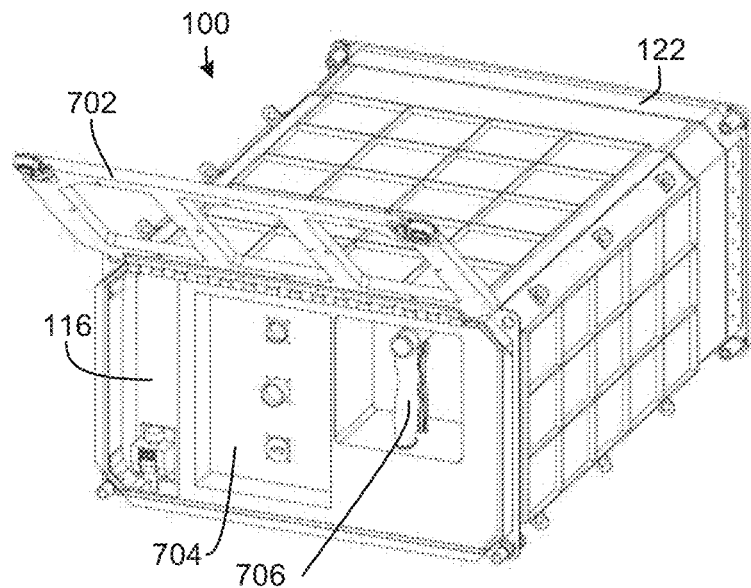
FIG. 7 is a front perspective view of a recycler device, according to an aspect of the present disclosure.
Figure 8:
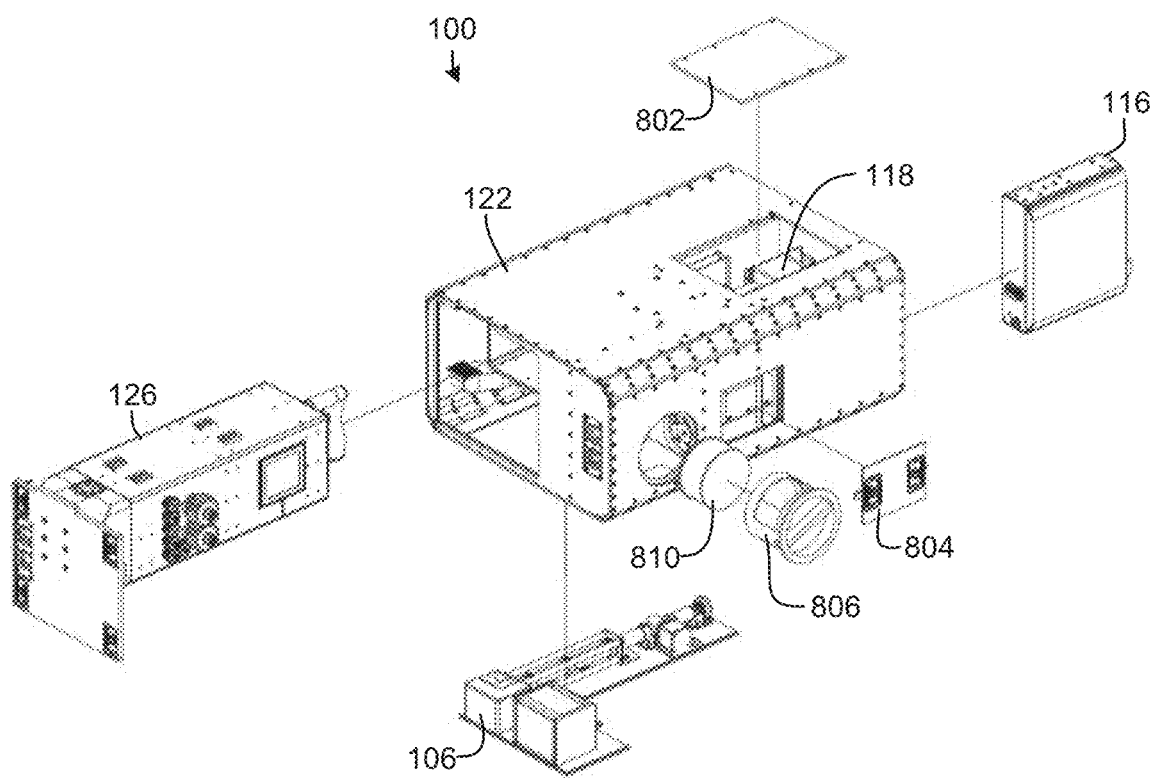
FIG. 8 is a rear exploded view of a recycler device, according to an aspect of the present disclosure.
Figure 9:
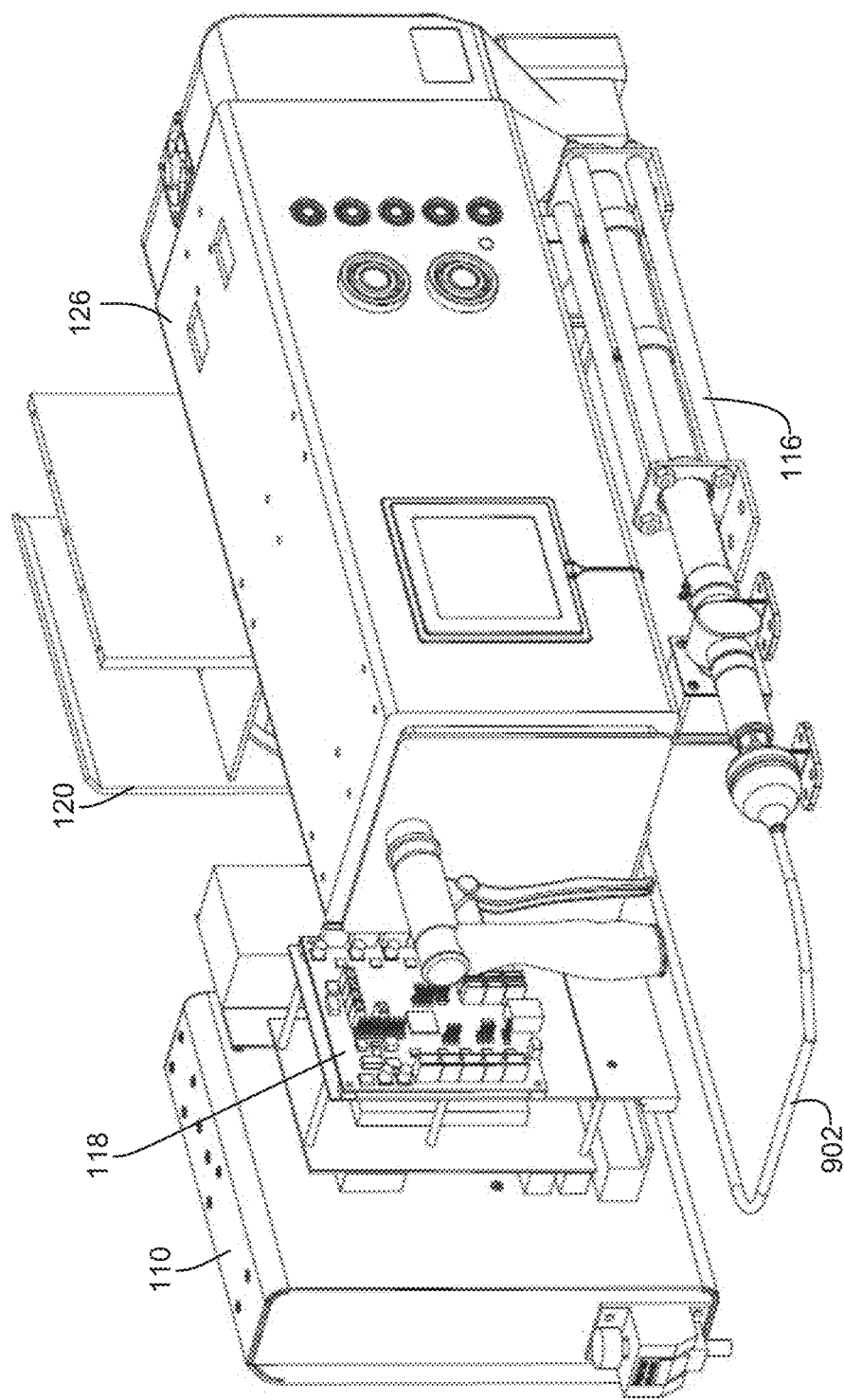
FIG. 9 is a perspective view of internal systems of a recycler device, according to an aspect of the present disclosure.
Figure 10:
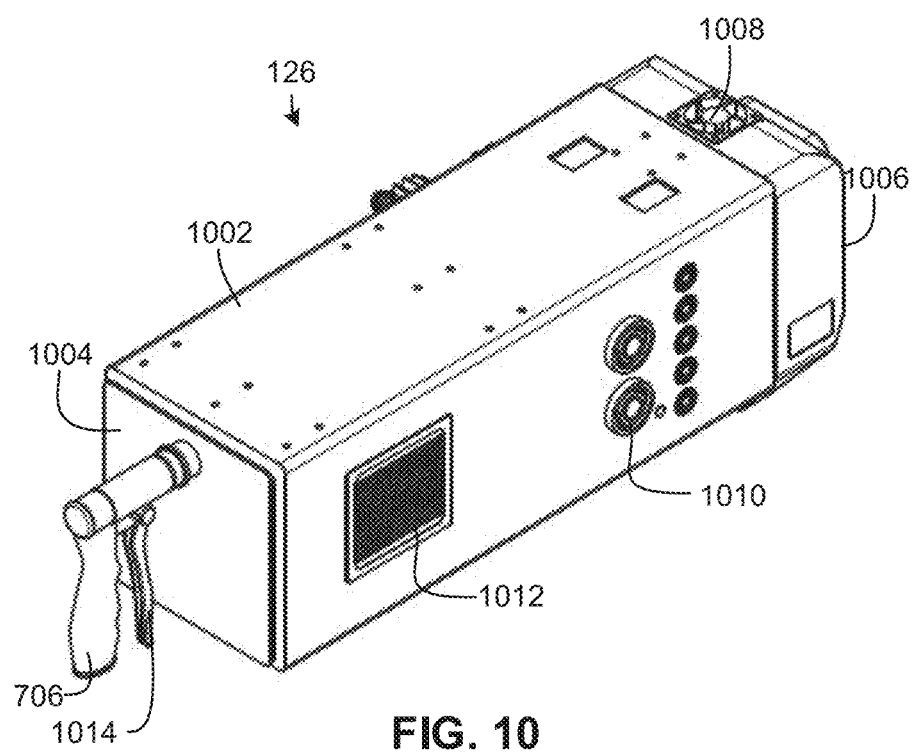
FIG. 10 is a perspective view of a material processing system of a recycler device, according to an aspect of the present disclosure.
Figure 11:
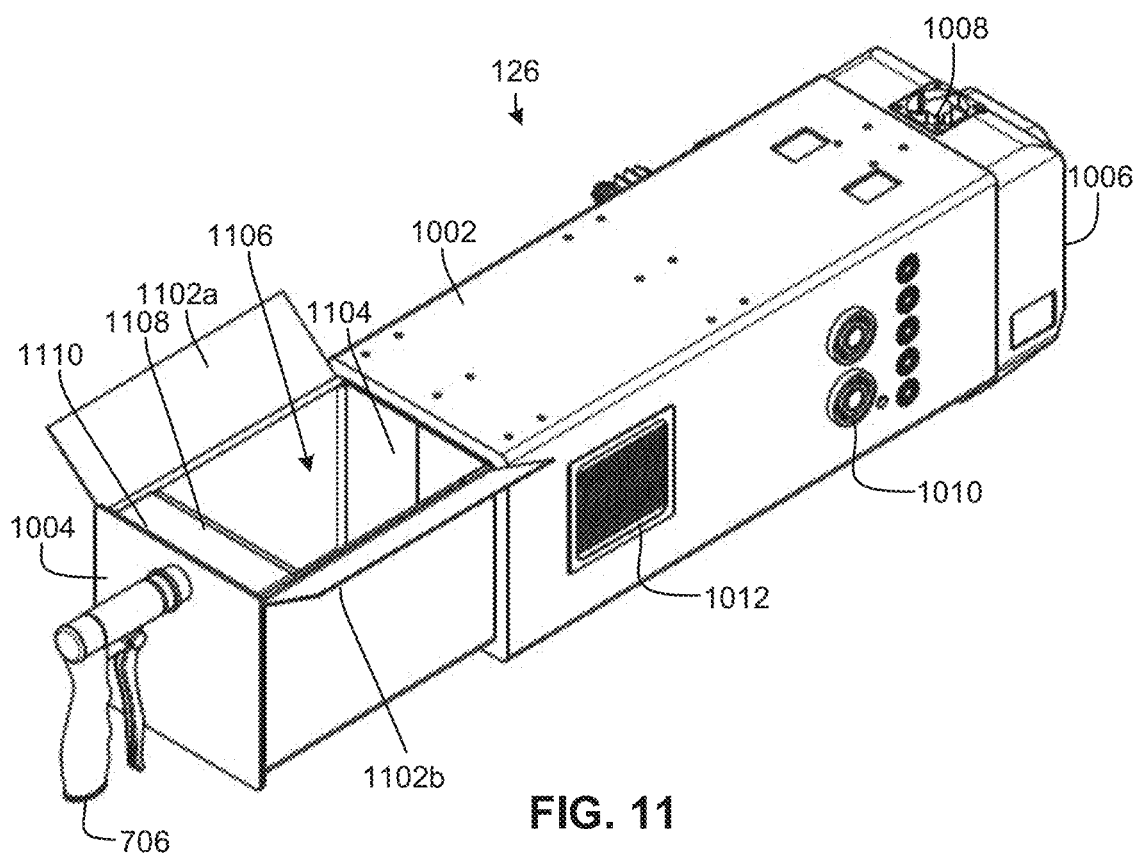
FIG. 11 is a perspective view of a material processing system of a recycler device, the loading area being opened to receive materials for processing, according to an aspect of the present disclosure.
Figure 12:
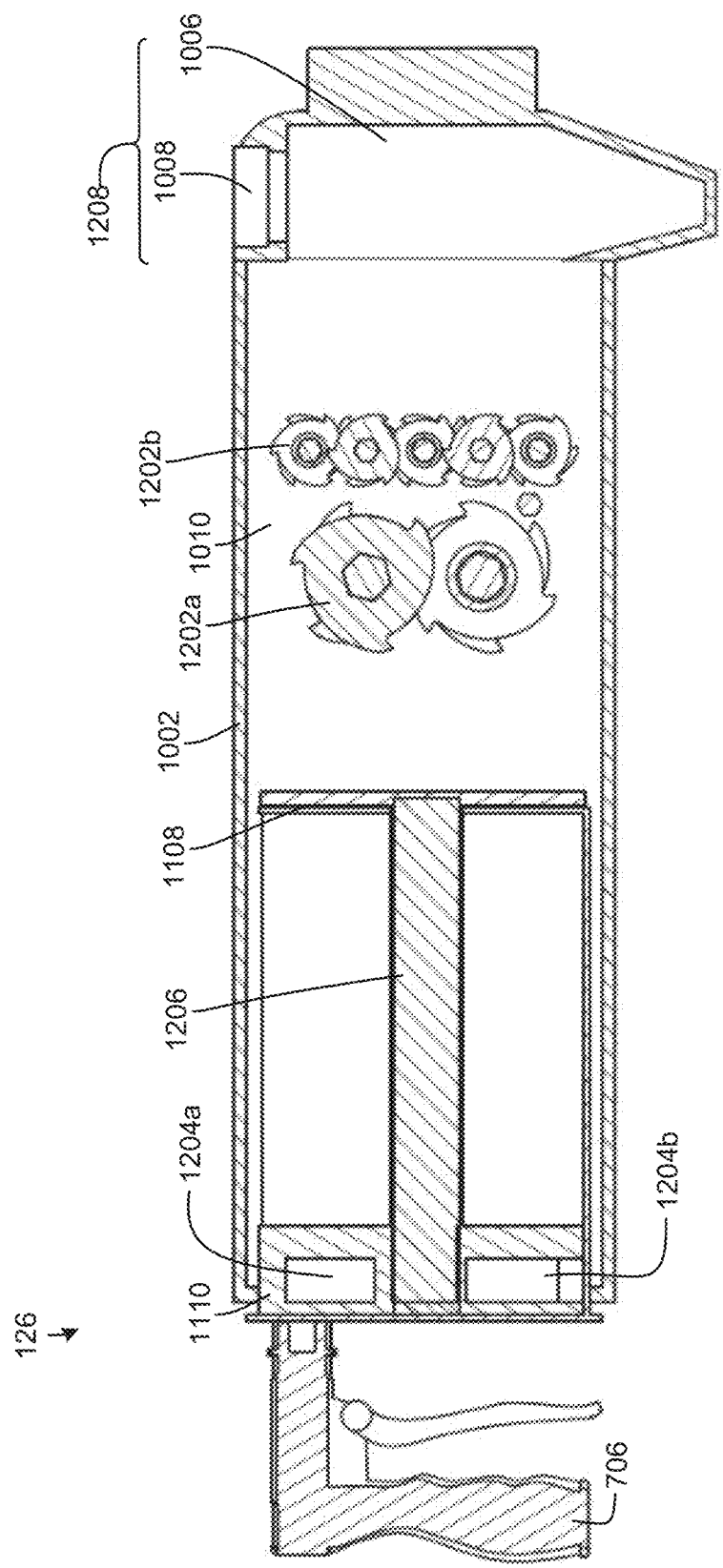
FIG. 12 is a side, cutaway view of a material processing system showing internal structure and components including the material size reducer, according to an aspect of the present disclosure.
Figure 13:
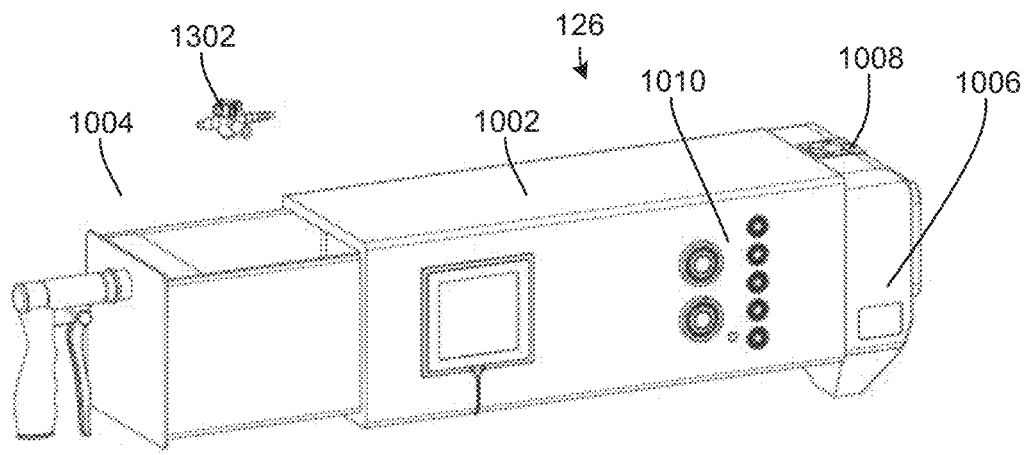
FIG. 13 is a perspective view of a material processing system receiving a part to be processed, according to an aspect of the present disclosure.
Figure 14:
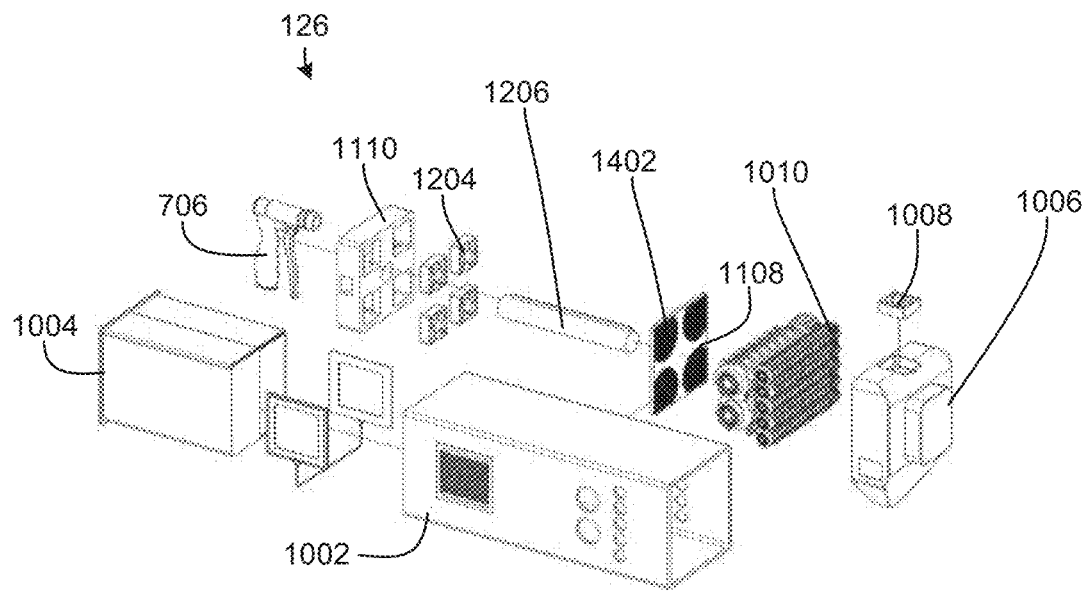
FIG. 14 is an exploded view of a material processing system, according to an aspect of the present disclosure.

Referring now to FIGS. 7-9, various views of recycler device 100 and portions thereof, according to various aspects of the present disclosure, are shown.

Recycler device 100 may be configured for rack mounting. Removable cartridge 116 interfacing with and/or containing portions of spooling assembly 110 may be accessed from the front of recycler device 100. A door 702 may cover the front of recycler device 100, preventing inadvertent actuation of device controls and providing additional protection for the surrounding environment and individuals and equipment therein if device 100 malfunctions. A control and notifications panel 704 may be located on the front of device 100, viewable through a window in door 702. Loading area 124 of material processing system 126 may be accessed via a handle 706 or other actuator.

Housing 122 may include various removable panels such as electronics access panel 802 and a side panel 804 which facilitate user access, maintenance, repair and upgrading of device 100. Such panels may include latches or other locking mechanisms or quick release mechanisms in order to facilitate ease of access. Similarly, other components of device 100 may be mounted on panels or within housings positioned to all removal of such components from device 100 via latches, retainers or the like accessible from the exterior of housing 122. Material processing system 126 and extrusion mechanism 106 may each be mounted on plates which may be detached from housing 122 from the exterior of device 100 and removed. A filter 810 may be contained in a removable filter cover which may be unscrewed by hand and removed from device 100. Cartridge may be removed via actuation of a latch and sliding cartridge out from device 100.

Filament 200 may be guided from extrusion mechanism 116 to spooling assembly 110 via tubing 902, channels, or the like. Tubing material may be selected for its anti-bonding properties and heat dissipating properties in order to ensure that newly formed, hot filament 200, such as a thermoplastic filament does not bind to tubing 902 as it travels to spooling assembly and cools. Tubing 902 is positioned in order to avoid sharp bends or angles which increase the likelihood that filament 200 will bind, pinch or otherwise damage filament 200 or cause its diameter to deviate from a specified optimal size (e.g., 1.75 mm diameter).

Referring now to FIGS. 10-14, various views of material processing system 126 and portions thereof, according to various aspects of the present disclosure, are shown.

Figure 17A:
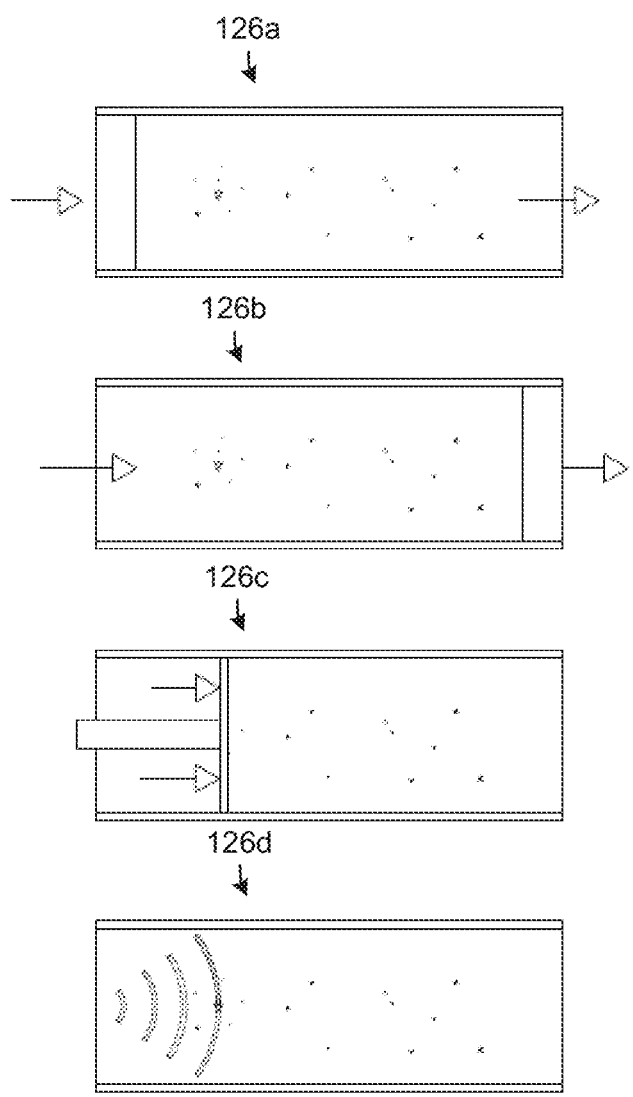
FIGS. 17A and 17B are images of various material control system configurations which may be implemented within the material processing system and/or other portions of a recycler device, according to various aspects of the present disclosure.
Figure 17B:
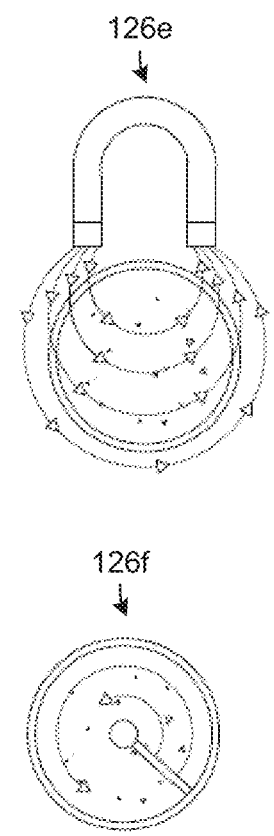
Figure 18:
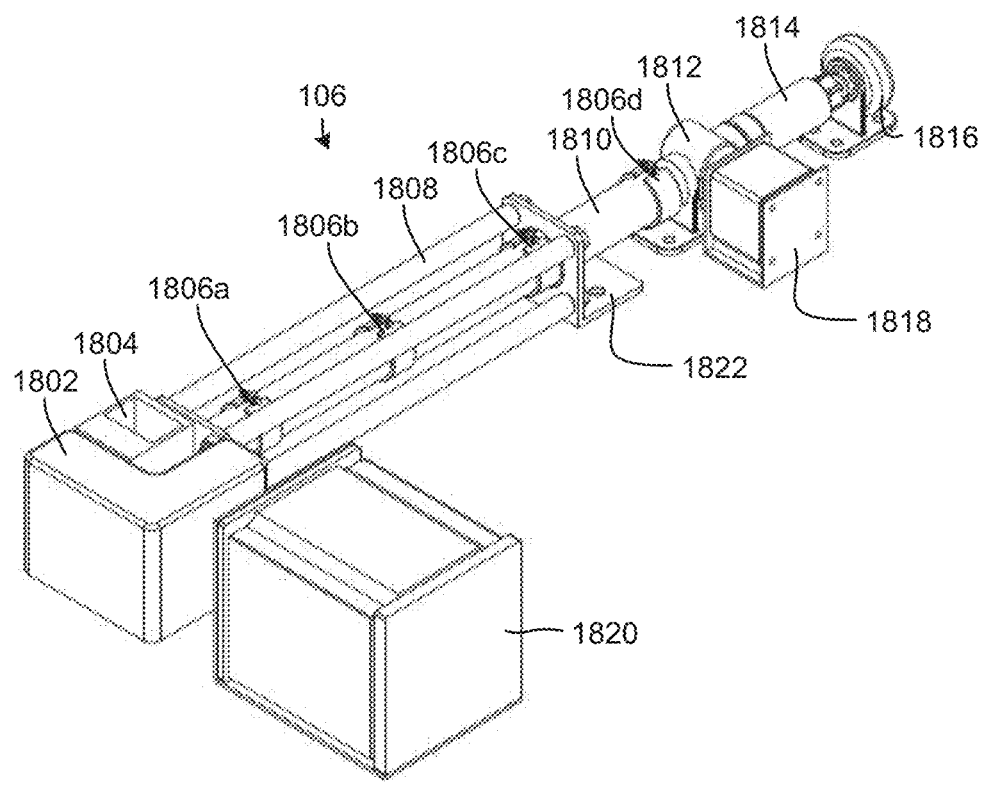
FIG. 18 is a perspective view of an extrusion mechanism of a recycler device, according to an aspect of the present disclosure.
Figure 19:
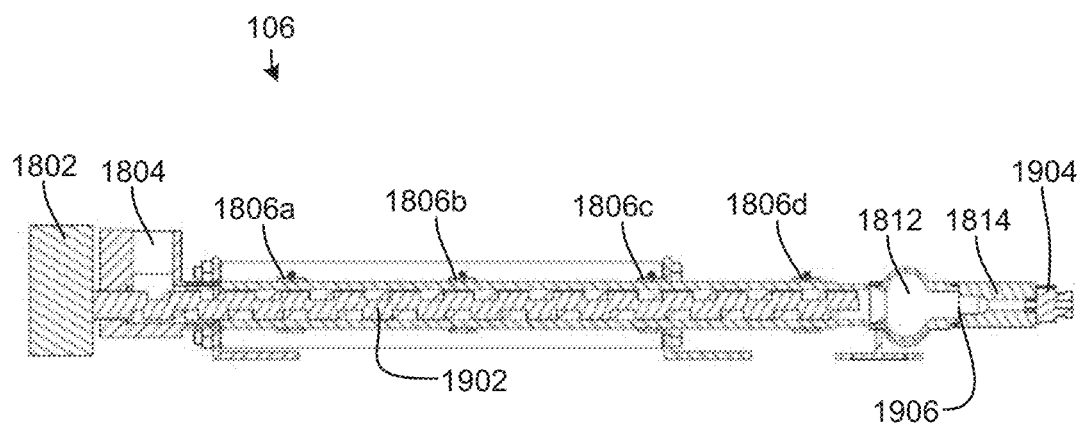
FIG. 19 is a side cutaway view of the extrusion mechanism of FIG. 18.
Figure 20:
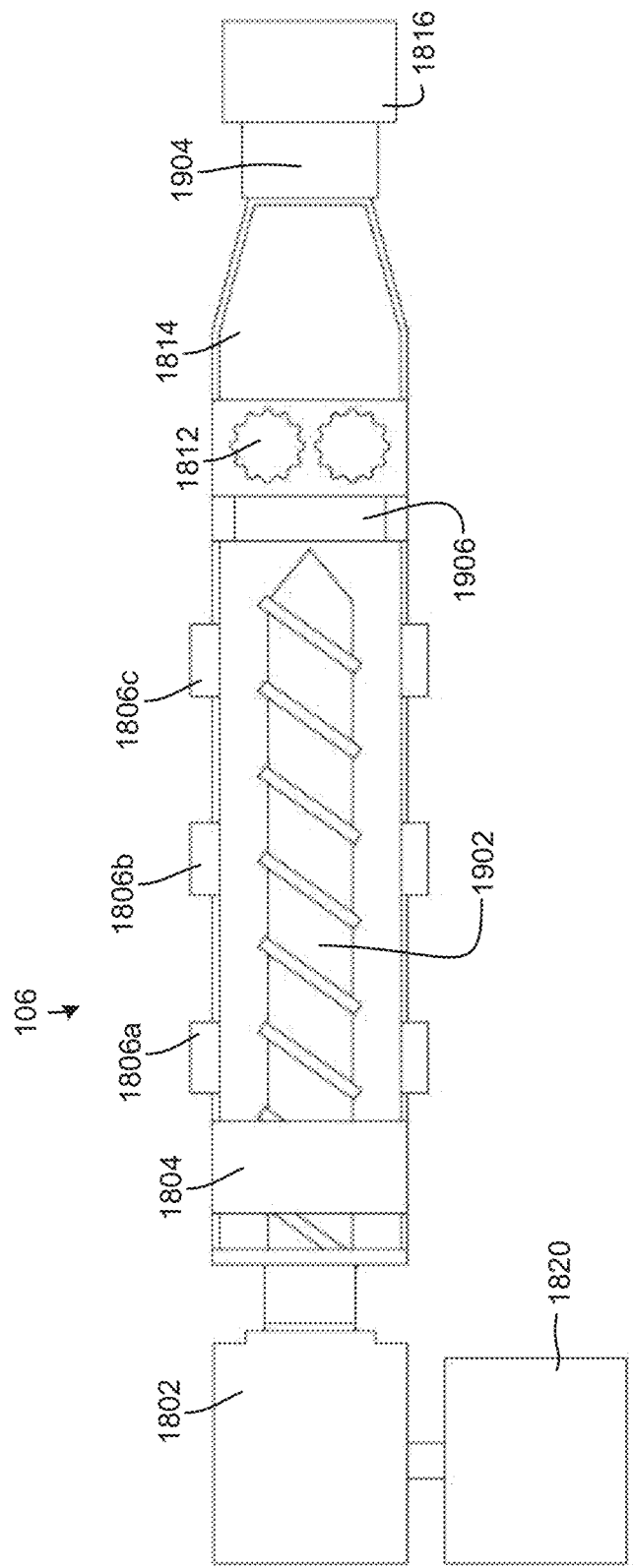
FIG. 20 is a schematic side view of an extrusion mechanism of a recycler device, according to an aspect of the present disclosure.

Material processing system 126 includes material control system 102 and material size reducer 104, namely a grinder 1010, housed within a material processing system housing 1002. Material control system 102 may include a series of fans 1204 (labelled as fans 1204a & b in FIG. 12) and a control plate 1108 positioned within loading area 124, namely within a sliding loading chamber 1004. Material control system fans 1204 are positioned within fan housing 1110 and are oriented such that fan exhaust pushes material, including smaller particles and fumes, through housing 1002 and toward material size reducer 104. Control plate 1108 is positioned in front of fans 1204 and, via pusher arm 1206, moves from a position adjacent fan housing 1110 to an extended position adjacent material size reducer 104, thereby forcing material placed inside material processing system 126 into material size reducer 104 for processing. Control plate 1108 includes one or more meshes 1402, grates or other air-permeable materials positioned in front of fans 1204 which permit fan exhaust to pass through control plate 1108 and move material through material processing system 126. Pusher arm 1206 may be a telescoping or rigid member controlled by control electronics 118, pushed by a user manipulating an attached handle, or the like. Pusher arm 1206 may be actuated by an electric motor, hydraulics, cables, or the like. As shown in FIGS. 17A & B, other mechanisms may be used to feed material through material processing system including fans placed at various points (as in 126a and 126b), wave or fluid action (as in 126d), magnetic control (as in 126e), centrifugal forces (as in 126f), and the like.

Loading chamber 1004 may be positioned at a front end of rectangular housing 1002 and slide in an out of housing 1002. A handle 706 may be located on a front side of loading chamber 1004, enabling users to open loading chamber 1004. Handle 706 may include a trigger 1014 or other actuator which may unlock loading chamber 1004. Loading chamber 1004 includes two actuated access doors 1102 (labelled as access doors 1102a & b in FIG. 11) on the top side of loading chamber 1004. When loading chamber 1004 is pulled out of housing 1002, access doors 1102 open, thereby allowing material such as a part 1302 to be placed in device 100 for repurposing. Access doors 1102 may be manually, mechanically (e.g., spring loaded) or electrically controlled. In some aspects, loading chamber volume 1106 may be 6 cm×12 cm×6 cm. Loading chamber 1004 includes material processing system doors 1104 which form a rear wall of loading chamber 1004. Material processing system doors 1104 open toward material size reducer 104 and close prior to the opening of access doors 1102, preventing backflow of material once it has been moved toward material size reducer 104.

Housing 1002 may include a dehumidifier element 1012 positioned before material size reducer 104 in order to reduce water present in the material before processing. Hydrolysis negatively affects the quality of filament 200 produced by device 100. Dehumidifier element 1012 reduces water content, thereby reducing hydrolysis.

Grinder 1010 includes one or more sets of rotating blades 1202 (labeled as rotating blades 1202*a* & *b* in FIG. 12) selected to reduce the size of material put in device 100 to a size useable by extrusion mechanism 106. Grinder 1010 is controlled by a motor and granulates material into small pieces (e.g., 3 mm pieces). The rear face of grinder 1010 may include a sieve having openings sized to allow through only pieces small enough for extrusion mechanism 106.

Once the material is processed by material size reducer 104 (e.g., grinder 1010), the material is channeled to extrusion mechanism by a funnel 1006. In some aspects, funnel is part of a dryer system 1208 positioned after material size reducer 104 to further reduce water content and avoid hydrolysis. Dryer system may include a chamber having funnel as an opening to extrusion mechanism 106 and a drying fan 1008.

Material processing system 126 may include one or more sensors to monitor conditions within material processing system 126 and progress of material being processed by material processing system 126. The operation of all or portions of material processing system 126 including access doors 1102, material processing system doors 1104, material control system 102, material size reducer 104, dehumidifier element 1012, and drying fan 1008 may be controlled by controlling electronics 118. Operation of such systems may be controlled according to programmed timing and steps, based on sensor readings, or a combination thereof.

Figure 15:
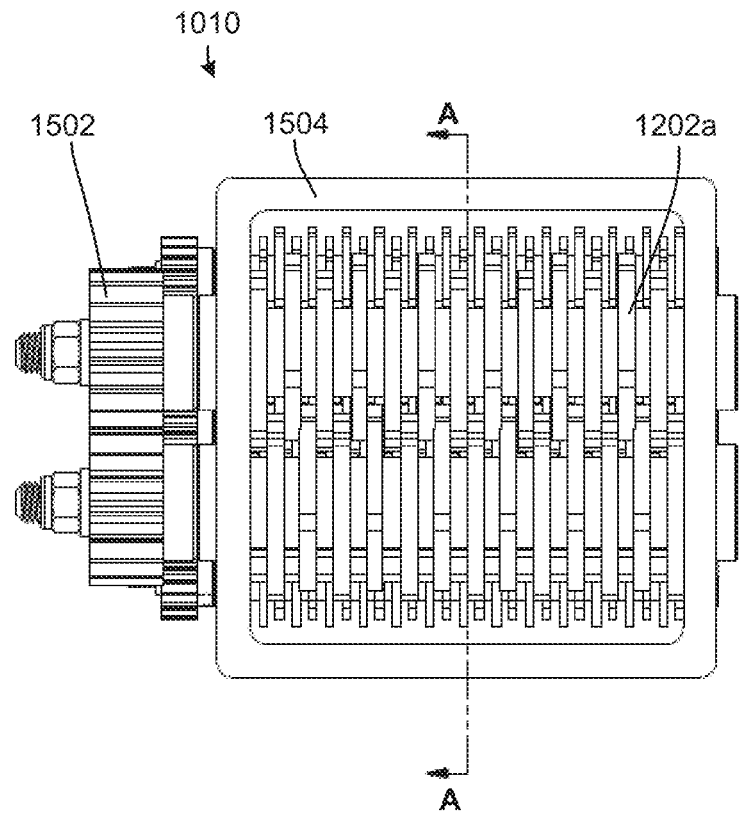
FIG. 15 is a front view of a grinding component of a material processing system, according to an aspect of the present disclosure.
Figure 16:
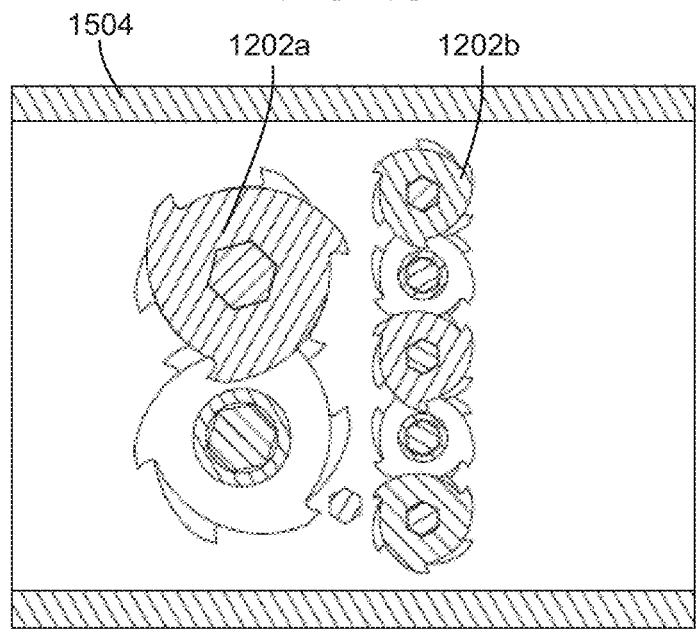
FIG. 16 is a side cutaway view along cut line A of the grinding component of FIG. 15.

Referring now to FIGS. 15 and 16, a front view and a cutaway view of an exemplary material size reducer 104, namely grinder 1010, according to various aspects of the present disclosure, are shown. Material size reducer 104 may multiple rotating blades 1202. Each set of blades 1202 may be mounted on a ball bearing and controlled by a motor. Material is inserted into a first portion of material size reducer 104, blades 1202 cut and crush the material into the desired size and shape. Blade sets 1202 may be arranged in order of fineness in order to facilitate efficient cutting of material. As will be apparent to those skilled in the relevant art(s) after reading the description herein, other mechanisms for reducing material size may be employed apart from or in addition to blades.

Referring now to FIGS. 18-24, various views of extrusion mechanism 106 and portions thereof, according to various aspects of the present disclosure, are shown.

Extrusion mechanism 106 moves processed material through a series of heaters which melts the material, passes the material through a series of breaker plates and other components to uniform the flow, and then finally through a die that controls the filament diameter. Extrusion mechanism 106 ensures that a constant feed rate is established while maintaining steady heating and thermal management.

Figures 21, 22:
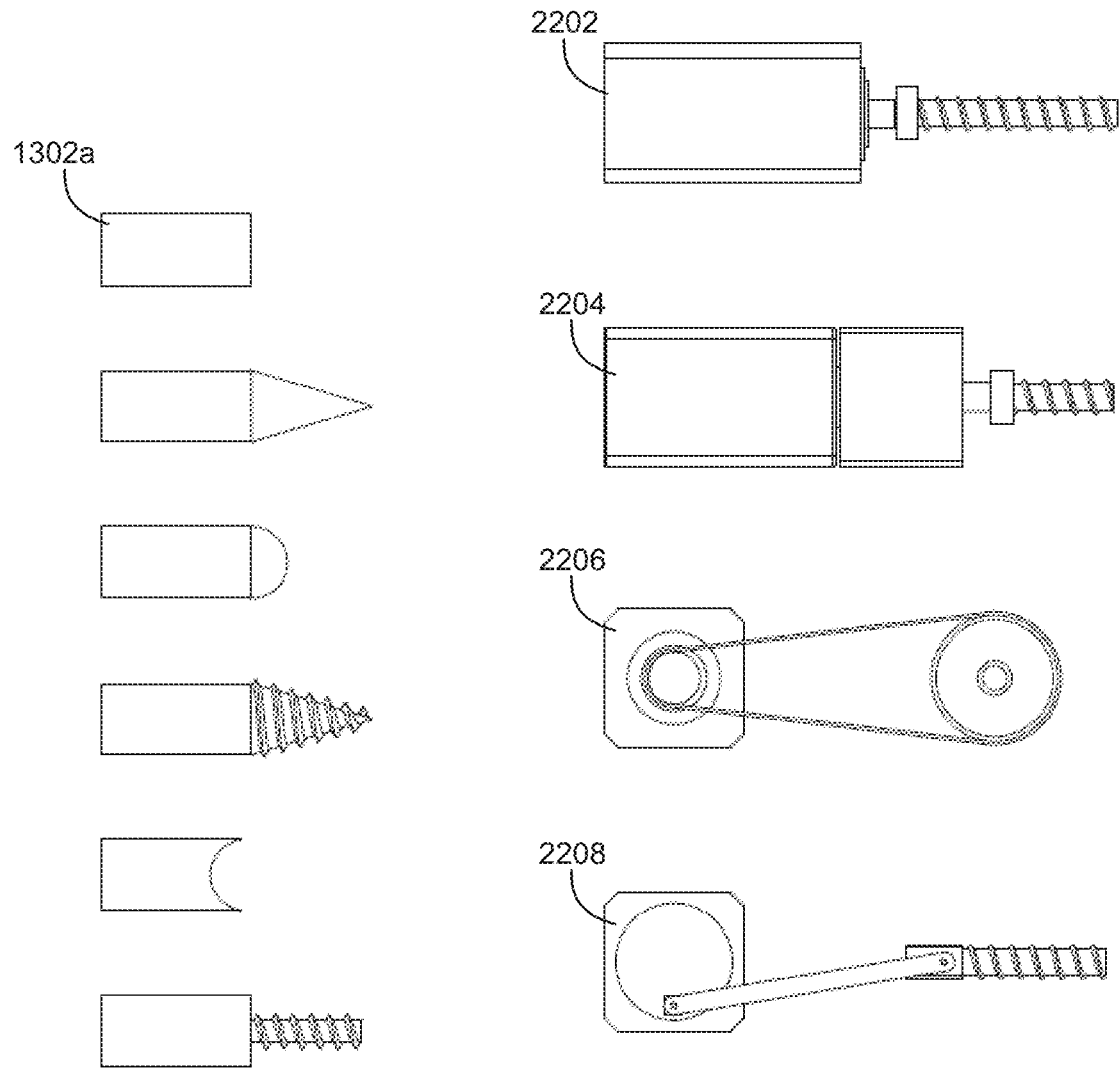
FIG. 21 is an image of various configurations of an auger end portion, according to various aspects of the present disclosure.
FIG. 22 is an image of various drive methods for an extruder, according to various aspects of the present disclosure.

Extrusion mechanism 106 may include a material opening 1804 configured to receive processed material from material processing system 126 and introduce the material to auger 1902. Auger 1902 is driven by an auger motor 1820 and forces material down barrel 1810. In some aspects, auger 1902 is connected to auger motor 1820 via a gear box. FIG. 22 depicts various configurations for driving auger 1902, including a direct drive system 2202, a gear box system 2204, a belt drive system 2206, a piston drive system 2208 and a combination piston and motor system 2210. Auger 1902 is housed with a barrel 1810. Barrel 1810 is supported by support arms 1808 and heated by heaters such as band heaters 1806 (labelled as band heaters 1806*a-d* in FIG. 18). Extrusion mechanism 106 may be mounted within device 100 via one or more brackets 1822. Depending on the material being processed, auger 1902 rotation speed may be varied and the temperature of barrel 1810 may be altered by the heaters. For example, barrel 1810 may be heated to 240° C. in order to melt plastic material in extrusion mechanism 106.

A gear pump 1812 is connected to the end of barrel 1810 and receives molten material. Gear pump 1812 is driven by a gear pump motor 1818 and alleviates variations in pressure and creates a constant flow of amorphous material, thereby facilitating creation of an unbroken line of filament 200. Mesh screens and a breaker plate 1906 may be positioned after gear pump in order to eliminate contaminants and facilitate consistent filament 200 extrusion. Material then passes into a pipe reducer 1814 and into a die 1904 which shapes and extrudes filament 200. A filament cooler 1816, such as a bladeless fan, may be positioned adjacent to die 1814 in order to cool newly formed filament 200. Filament 200 enters tubing 902 and travels to spooling assembly 110.

Figure 23:
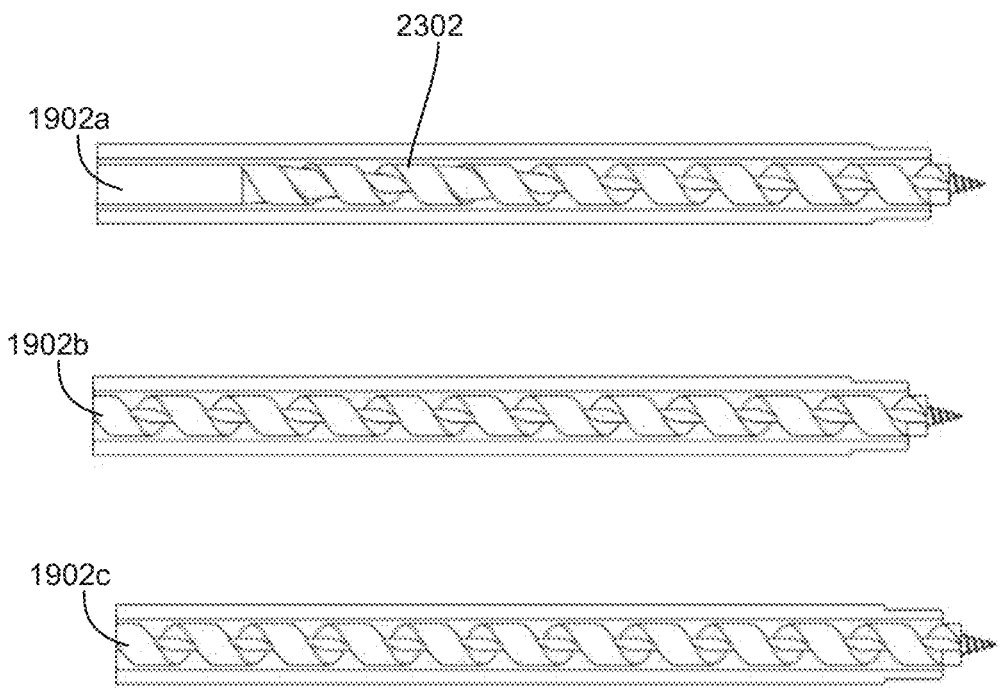
FIG. 23 is an image of various configurations of an auger portion of an extruder, according to various aspects of the present disclosure.
Figure 24:
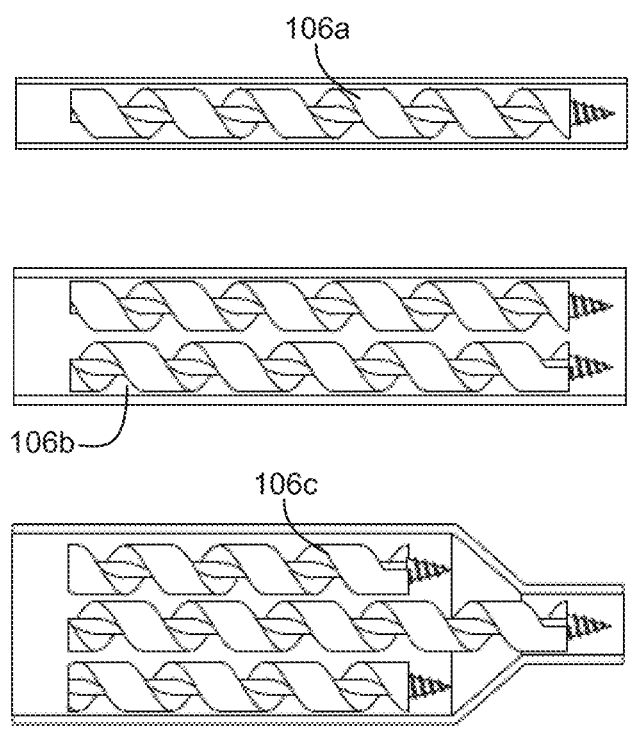
FIG. 24 is an image of various configurations of an extruder, namely the number and arrangement of augers within the extruder, according to various aspects of the present disclosure.
Figure 25:
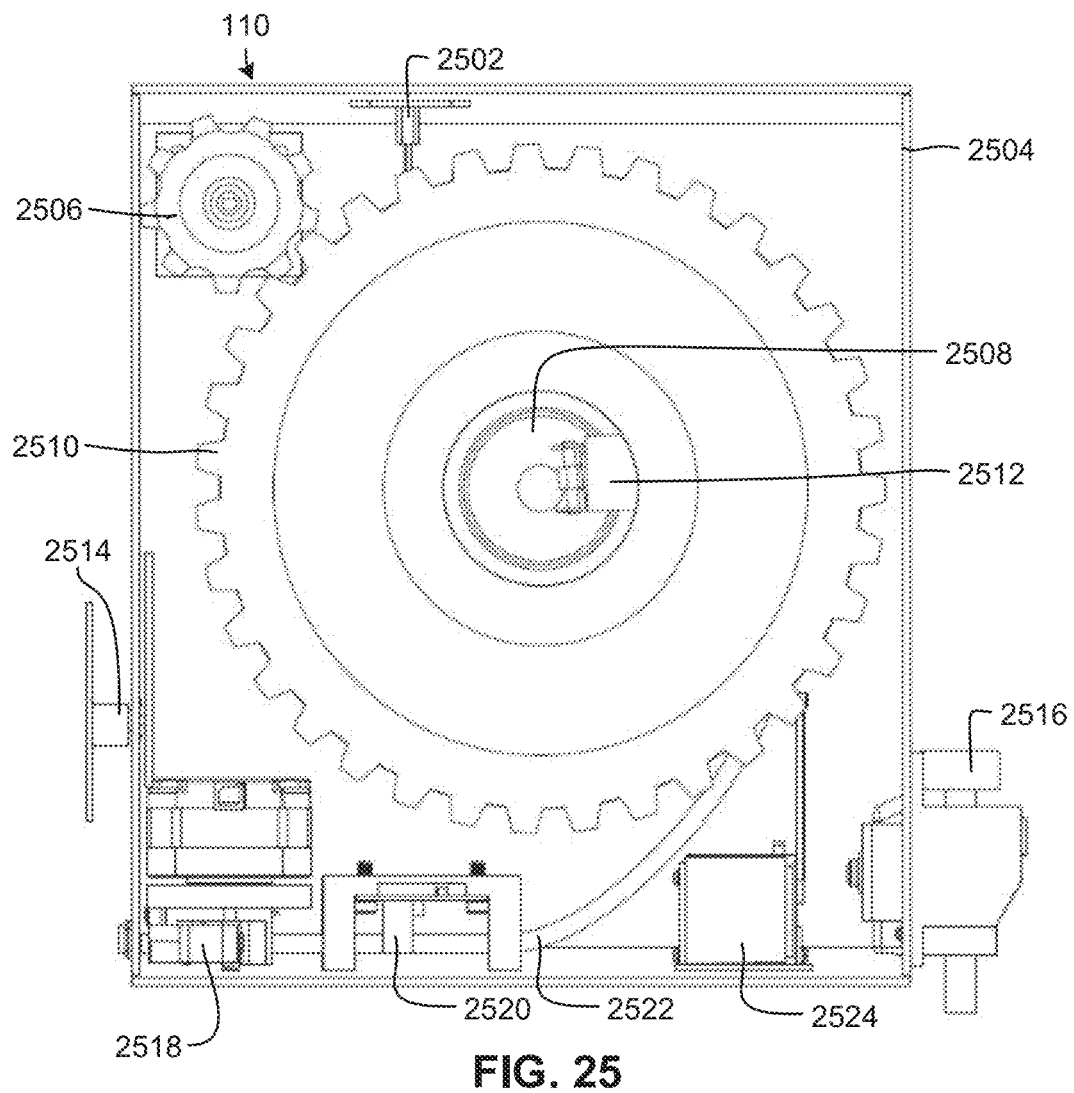
FIG. 25 is a side view of a spooling assembly for a recycler device having an outer cover removed, according to an aspect of the present disclosure.
Figure 26:
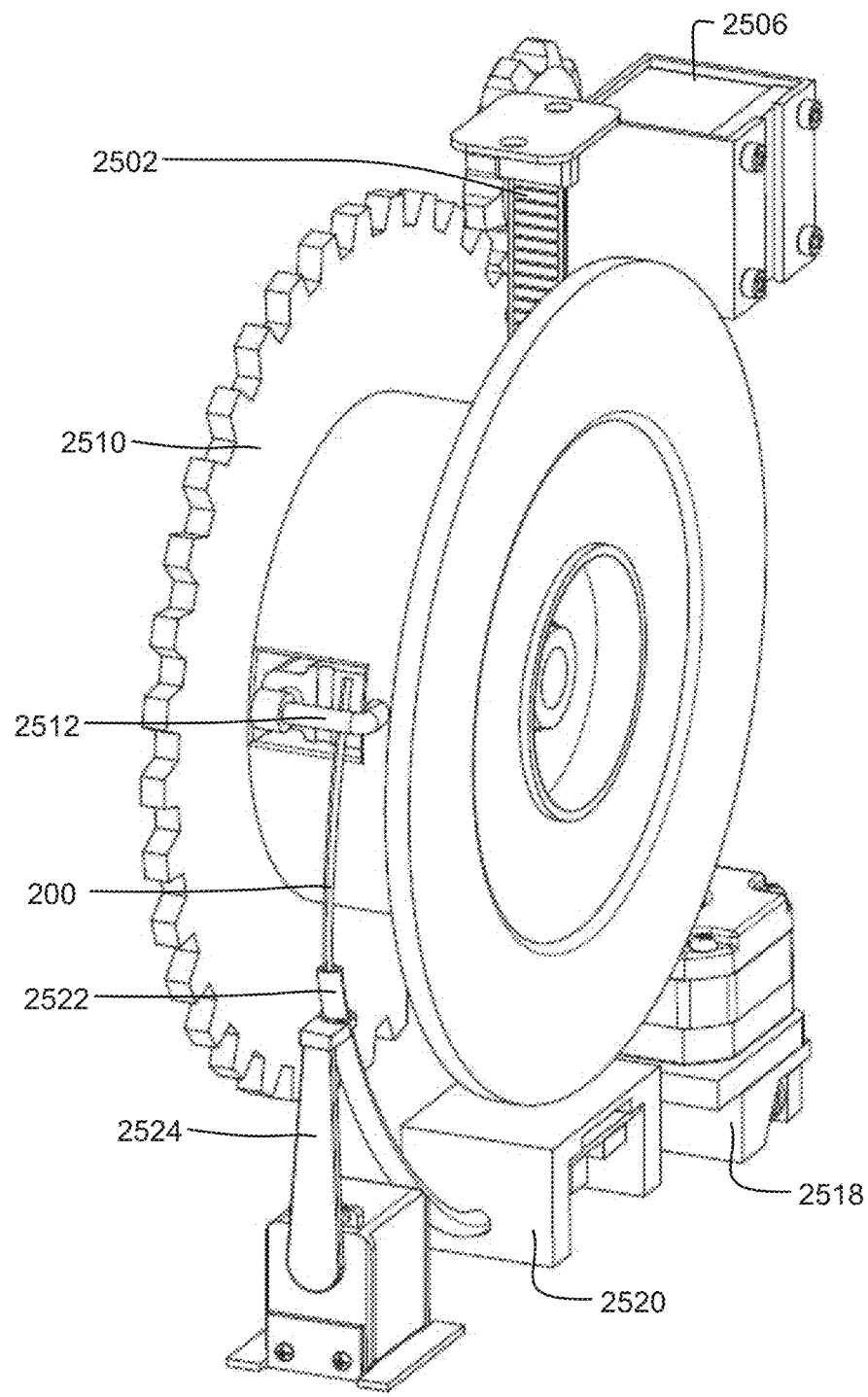
FIG. 26 is a perspective view of internal components of a spooling assembly for a recycler device, according to an aspect of the present disclosure.
Figure 27:
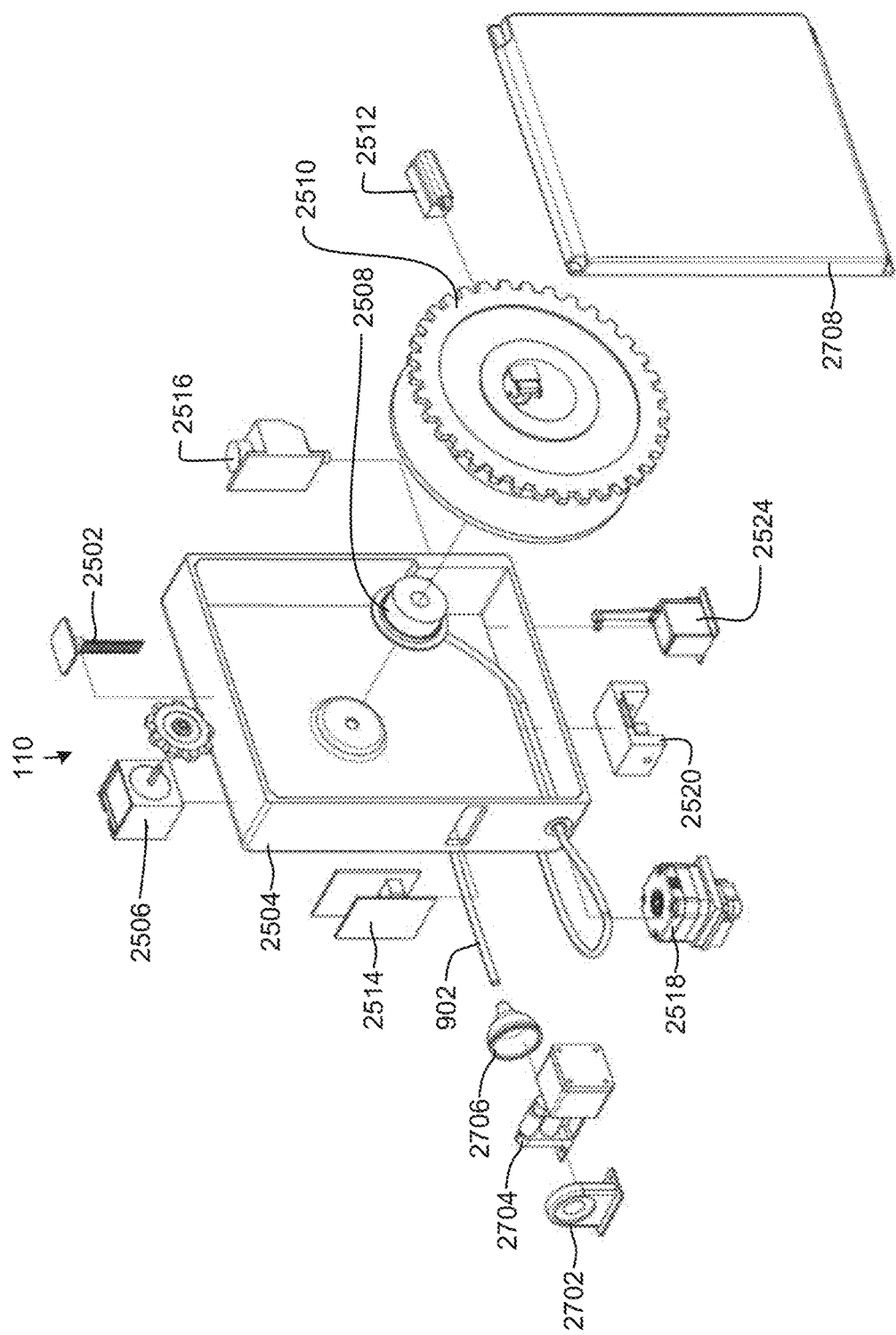
FIG. 27 is an exploded perspective view of a spooling assembly for a recycler device, according to an aspect of the present disclosure.
Figure 28:
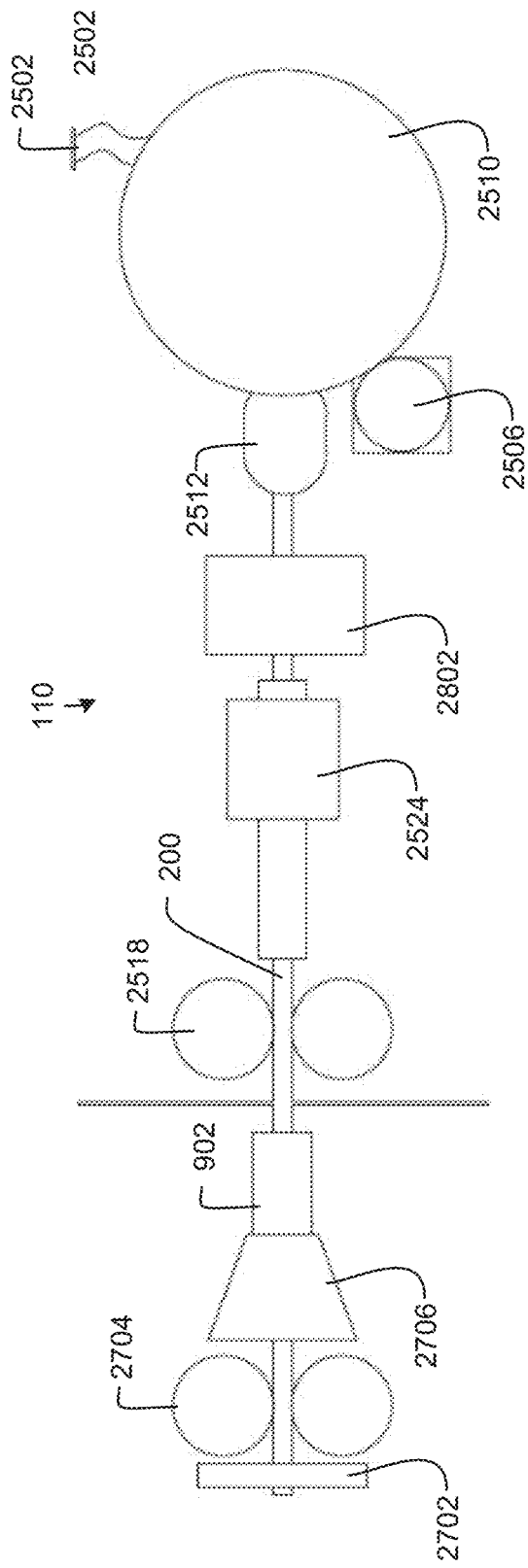
FIG. 28 is a schematic side view of a spooling assembly of a recycler device, according to an aspect of the present disclosure.

As shown in FIGS. 23 and 24, extrusion mechanism 106 may include augers 1902 with a variety of profiles including a metered auger 1902*c*, a constant auger 1902*b* and a metered auger 1902*a* having a relief section 2302. Auger-based extrusion mechanism 106 may comprise one auger 106*a*, two augers 106*b* or a combination system 106*c*. Auger end portion 1302 may be configured in a variety of ways, such as those shown in FIG. 21 in order to facilitate creation of filament 200.

Referring now to FIGS. 25-30, various views of spooling assembly 110 and portions thereof, according to various aspects of the present disclosure, are shown.

As will be apparent to those skilled in the relevant art(s) after reading the description herein, some or all of spooling assembly 110 may be contained within a removable cartridge 116. In other aspects, only spool 2510 is removable from device 100. In yet other aspects, no portion of spooling assembly 110 is removable from device 100. In such aspects, filament 200 may be fed from device 100 to additive manufacturing device 300, external spools, or other devices.

In an aspect, spooling assembly 110 begins by cooling filament 200 via, for example, one or more fans, as it exits the extrusion mechanism 106 in order to avoid any unintended deformation as filament 200 is being spooled. Feedback from the extruder mechanism 106 regarding internal pressures of the material being extruded may be received by controlling electronics 118 and will determine the rate at which filament 200 is spooled. This aids in maintaining a constant diameter on filament 200 being produced. Filament 200 may be fed into feedstock cartridge 116 through a center hub using the same filament guide tube that feedstock cartridge 116 uses to dispense the feedstock into additive manufacturing device 300.

Spooling assembly 110 may include a spool assembly casing 2504 enclosing a spool 2510 rotating on a slip ring 2508. In some aspects, casing 2504 is cartridge 116. Slip ring 2508 may house a feedstock guide tube which exists spool assembly casing 2504 via a spool assembly casing cover 2708. Spooling assembly 110 includes a filament securing mechanism 2512 configured to secure a leading end of filament 200 to spool 2510 for winding. In some aspects, filament securing mechanism is a linear actuator having a toothed end attachment which latches onto the leading end of filament 200 after filament 200 is detected entering spooling assembly 110 and has traveled a sufficient distance to be secured by filament securing mechanism 2512. In other aspects, filament securing mechanism 2512 includes a sensor which detects when the leading end of filament 200 is and secures filament 200 based on such readings. In another aspect, filament securing mechanism 2512 is a passive channel, hole, series of holes, or another configuration apparent to those skilled in the relevant art(s) after reading the description herein. In some aspects, filament securing mechanism 2512 is omitted.

During filament 200 creation, spool 2510 is rotated by a spool motor 2506 in order to ensure uniform distribution of filament on spool and to avoid binding, pinching or otherwise damaging filament 200. Spool motor 2506 may have a gear interfacing with a geared perimeter of spool 2510. In other aspects, spool motor 2506 drives spool 2510 via a belt.

A filament level detector 2502 may be included in spooling assembly 110 in order to detect the amount of filament on spool 2510. Filament level detector may be a flex sensor positioned to contact filament 200 spooled on spool 2510 and deflect, thereby indicating a filament level. In other aspects, the amount of filament 200 on spool 2510 is determined by the length of filament 200 produced by extrusion mechanism 106, how much material has been placed in material processing system 126, how much filament has entered spool assembly casing 2504, or a combination thereof. Multiple indications of filament level may be recorded.

Figure 29:
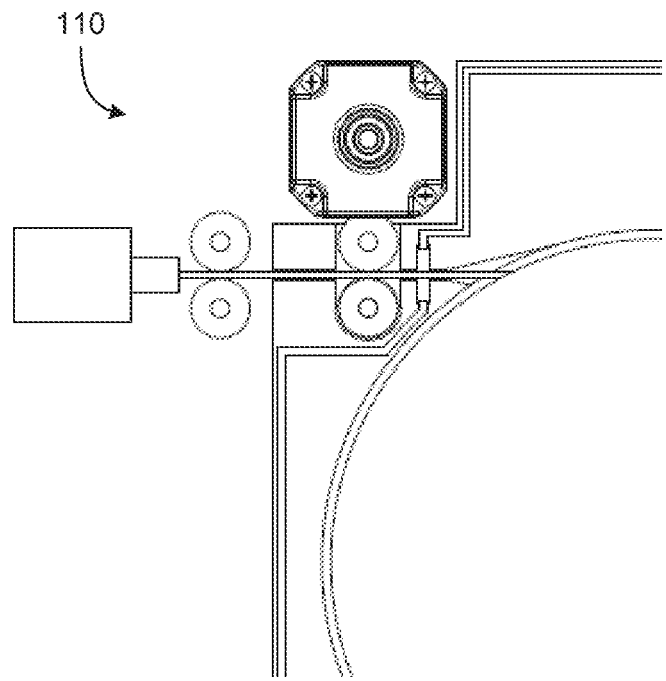
FIG. 29 is a detail image of a portion of a spooling assembly, according to an aspect of the present disclosure.
Figure 30:
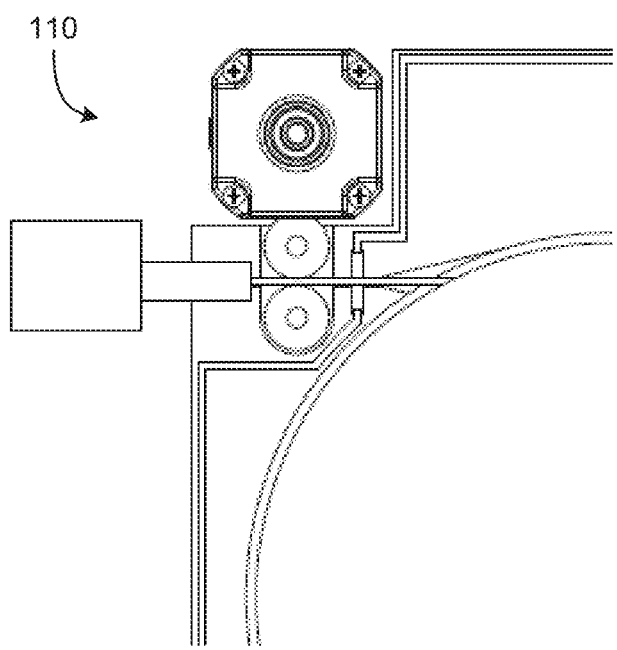
FIG. 30 is a detail image of a portion of a spooling assembly, according to an aspect of the present disclosure.

Filament 200 may be spooled by spooling assembly 200 by first traveling through a set of filament rollers 2704 near die 1904. A funnel 2706 may be positioned after filament rollers 2704 which guides filament 200 into tubing 902. A filament cutter 2702 may be located before filament rollers 2704 and controlled by controlling electronics 118. Cutter 2702 may cut filament 200 when extrusion mechanism 106 has extruded all material supplied to it, thereby ensuring that filament has a clean end portion. Device 100 may include multiple filament cutters. Tubing 902 may extend to cartridge 116 such as housing 2504. Cartridge rollers 2518 inside housing 2504 receive filament 200 and filament speed is controlled by filament feeding mechanism 2518. Filament feeding mechanism 2518 may be a line winder or other motorized component. Filament 200 is detected by a filament detector 2520 positioned inside housing 2504. Filament detector 2520 may be a phototransistor configured to detect the presence of filament 200 as well as breaks in filament 200. Filament 200 is guided to spool 2510 via a tubing 2522 and placed on spool 2510 by a filament winder 2524 which oscillates across the width of spool 2510, thereby evenly distributing filament 200. A power and data connection 2514 connects spooling assembly 110 to controlling electronics 118 allowing controlling electronics 118 to regulate and monitor spooling assembly 110 activity. For example, spool motor 2506 and filament winder 2524 speed may be determined by the speed of incoming filament detected by, for example a photo sensor 2802 positioned within housing 2504 and/or filament detector 2520. A latch 2516 may be released by a user in order to remove housing 2504 from device 100 for use or storage elsewhere. In some aspects, filament 200 is dispensed from housing 2504 via opening it initially entered housing 2504. As shown in FIGS. 29 and 30, spooling assembly 110 may include multiple rollers or other guides in order to control filament 200.

Controlling electronics 118 may be connected to a plurality of sensors distributed throughout device 100 in order to control and regulate the operation of device 100 and produce continuous filament 200 having a uniform diameter and other characteristics while remaining within operational tolerances. Sensors include but are not limited to flowmeters, pressure sensors, temperature sensors, contaminant sensors, and the like. Thermal management will be monitored to establish proper heating and cooling, as well as having emergency cutoff circuits in the event of off nominal heating.

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures. As will be appreciated by those skilled in the relevant art(s) after reading the description herein, certain features from different aspects of the systems, apparatus and methods of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A recycler device configured to produce additive manufacturing filament from received material, the received material comprising at least one previously manufactured object, comprising:
   a material processing system configured to receive the material, the material processing system comprising:
   a material size reducer; and
   a material control system configured to force the received material through the material processing system, the material control system comprising a fan and a movable control plate positioned adjacent to the fan;
   an extrusion mechanism configured to receive the processed material from the material processing system and create the additive manufacturing filament from the processed material, the additive manufacturing filament being continuous and having an approximately uniform diameter;
   a spooling assembly configured to receive the additive manufacturing filament from the extrusion mechanism and load the additive manufacturing filament onto a spool; and
   a material processing system housing;

wherein the material control system and the material size reducer are contained within the material processing system housing, the material processing system housing comprising a dehumidifying element;

wherein the material processing system comprises a loading chamber;

wherein the material control system is positioned within the loading chamber; and wherein the control plate is configured to allow fan exhaust to pass through at least a portion of the fan and the control plate is configured to move material placed in the loading chamber to the material size reducer by physical contact and exhaust pressure.

2. The recycler device of claim 1, the loading chamber comprising actuated doors; wherein the doors, the fan and the movable control plate are electronically controlled.

3. The recycler device of claim 1, the material processing system further comprising a drying system positioned after the material size reducer, the drying system configured to reduce water content of the received material.

4. The recycler device of claim 1, wherein the recycler device is configured to create filament from at least one of: acrylonitrile butadiene styrene; polyethylene; high density polyethylene; low density polyethylene; nylon; and polymer foam.

5. The recycler device of claim 1, wherein the recycler device is configured to create filament from at least one of: ferrous metal; non-ferrous metal; composite; resin-based material; and in-situ material.

6. The recycler device of claim 1, wherein the recycler device is integrated into an additive manufacturing device and configured to produce filament usable by the additive manufacturing device.

7. The recycler device of claim 1, the spooling assembly comprising a filament securing mechanism positioning within the spool, the filament securing mechanism configured to attach a leading end portion of the additive manufacturing filament to the spool for filament loading.

8. The recycler device of claim 7, the spooling assembly further comprising a filament winder configured to evenly distribute the additive manufacturing filament across a spool width during filament loading.

9. The recycler device of claim 7, the spooling assembly further comprising a filament break detector.

10. The recycler device of claim 7, the spooling assembly further comprising a spool motor connected to the spool, configured to rotate the spool based on an incoming filament speed.

11. The recycler device of claim 1, the spooling assembly further comprising a filament level detector positioned along a spool width and configured to detect a loaded additive manufacturing filament level present on the spool.

12. The recycler device of claim 11, wherein the filament level detector is a flex sensor.

13. The recycler device of claim 1, further comprising:
a device housing containing the material processing system, the extrusion mechanism and the spooling assembly; and
an environmental control unit positioned within the device housing comprising at least one filtering element and configured to regulate a device environment within the device housing.

14. The recycler device of claim 1, further comprising:
controlling electronics, the controlling electronics configured to monitor, via a plurality of sensors, the recycler device and regulate production of the additive manufacturing filament and regulate temperature throughout the recycler device.

15. A recycler device configured to produce additive manufacturing filament from received material, the received material comprising at least one previously manufactured object, comprising:
a material processing system configured to receive the material, the material processing system comprising:
a material size reducer; and
a material control system configured to force the received material through the material processing system, the material control system comprising a fan and a movable control plate positioned adjacent to the fan;
an extrusion mechanism configured to receive the processed material from the material processing system and create the additive manufacturing filament from the processed material, the additive manufacturing filament being continuous and having an approximately uniform diameter;
a spooling assembly configured to receive the additive manufacturing filament from the extrusion mechanism and load the additive manufacturing filament onto a spool; and
a material processing system housing;
wherein the material control system and the material size reducer are contained within the material processing system housing, the material processing system housing comprising a dehumidifying element;
wherein the material processing system comprises a loading chamber, the loading chamber comprises actuated doors, wherein the doors, the fan and the movable control plate are electronically controlled;
wherein the material control system is positioned within the loading chamber; and
wherein the control plate is configured to allow fan exhaust to pass through at least a portion of the fan and the control plate is configured to move material placed in the loading chamber to the material size reducer by physical contact and exhaust pressure.

16. The recycler device of claim 15, the material processing system further comprising a drying system positioned after the material size reducer, the drying system configured to reduce water content of the received material.

17. The recycler device of claim 15, the spooling assembly comprising a filament securing mechanism positioning within the spool, the filament securing mechanism configured to attach a leading end portion of the additive manufacturing filament to the spool for filament loading.

18. The recycler device of claim 15, further comprising:
a device housing containing the material processing system, the extrusion mechanism and the spooling assembly; and
an environmental control unit positioned within the device housing comprising at least one filtering element and configured to regulate a device environment within the device housing.

19. The recycler device of claim 15, further comprising:
controlling electronics, the controlling electronics configured to monitor, via a plurality of sensors, the recycler device and regulate production of the additive manufacturing filament and regulate temperature throughout the recycler device.

20. The recycler device of claim 15, the spooling assembly further comprising a filament level detector positioned along a spool width and configured to detect a loaded additive manufacturing filament level present on the spool.

* * * * *